US011188634B2

(12) United States Patent
Maroshi

(10) Patent No.: US 11,188,634 B2
(45) Date of Patent: Nov. 30, 2021

(54) METHOD FOR ASSISTING SECURE INSERTION OF PASSWORDS

(71) Applicant: David Maroshi, Kiryat Tivon (IL)

(72) Inventor: David Maroshi, Kiryat Tivon (IL)

(*) Notice: Subject to any disclaimer, the term of this patent is extended or adjusted under 35 U.S.C. 154(b) by 0 days.

(21) Appl. No.: 17/283,411

(22) PCT Filed: Nov. 8, 2020

(86) PCT No.: PCT/IL2020/051159
§ 371 (c)(1),
(2) Date: Apr. 7, 2021

(87) PCT Pub. No.: WO2021/090326
PCT Pub. Date: May 14, 2021

(65) Prior Publication Data
US 2021/0312030 A1   Oct. 7, 2021

(30) Foreign Application Priority Data

Nov. 10, 2019 (IL) .......................... 270556

(51) Int. Cl.
*G06F 7/04* (2006.01)
*G06F 21/36* (2013.01)
(Continued)

(52) U.S. Cl.
CPC .............. *G06F 21/36* (2013.01); *G06F 21/46* (2013.01); *G06F 21/602* (2013.01)

(58) Field of Classification Search
CPC .......... G06F 21/31; G06F 21/36; G06F 21/46; G06F 2221/2133; G06F 21/602;
(Continued)

(56) References Cited

U.S. PATENT DOCUMENTS 10,157,275 B1   12/2018   Venkatasamy et al.
2010/0275010 A1*  10/2010   Ghirardi ............... G06F 21/36
                                                     713/155
(Continued)

FOREIGN PATENT DOCUMENTS

IL              253226 A       9/2017
WO       2013129851 A1       9/2013

OTHER PUBLICATIONS

Just, Designing and Evaluating Challenge-Question Systems, Oct. 8, 2004, IEEE, pp. 32-39. (Year: 2004).*

(Continued)

*Primary Examiner* — Luu T Pham
*Assistant Examiner* — Jenise E Jackson
(74) *Attorney, Agent, or Firm* — The Roy Gross Law Firm, LLC; Roy Gross

(57) ABSTRACT

A method for mapping text password to a short sequence of never repeated images/figures, implementing 4 layers of separation/encryption. At configuration time: Associate textual password with a list of secret questions. At authentication time: Requesting the user to answer each secret question by selecting a picture representing an answer from a CAPTCHA like layout. Wherein the secret answers and target pictures are computed at runtime. Dynamic runtime passwords-answers association with pictures open new business opportunities, and solve mentioned challenges.

33 Claims, 29 Drawing Sheets

(51) Int. Cl.
*G06F 21/60* (2013.01)
*G06F 21/46* (2013.01)

(58) Field of Classification Search
CPC ..... G06F 21/45; G06F 21/604; H04L 9/0861; H04L 9/0863; H04L 9/3226; H04L 63/083; H04L 9/08; H04L 2463/082; H04W 12/06
USPC .......................................................... 726/19
See application file for complete search history.

(56) References Cited

U.S. PATENT DOCUMENTS

| | | |
|---|---|---|
| 2011/0239272 A1 | 9/2011 | Stone |
| 2014/0059672 A1 | 2/2014 | Natividad |
| 2014/0359734 A1 | 12/2014 | Natividad |
| 2015/0121489 A1 | 4/2015 | Yang et al. |
| 2016/0359839 A1 | 12/2016 | Natividad |

OTHER PUBLICATIONS

Luigi et al, Towards the Design of a Film-Based Graphical Password Scheme, IEEE, Dec. 12, 2013, pp. 388-393. (Year: 2013).*
PCT Search Report for International application No. PCT/IL2020/051159, dated Jan. 3, 2021, 4 pp.
PCT Written Opinion for International application No. PCT/IL2020/051159, dated Jan. 3, 2021, 4 pp.

* cited by examiner

METHOD FOR ASSISTING SECURE INSERTION OF PASSWORDS

DETAILS OF RELATED APPLICATIONS

This application is a national stage application under 35 U.S.C. § 371 of PCT/IL2020/051159 filed on Nov. 8, 2020, which claims the benefit of Israel application No. 270556 filed on Nov. 10, 2019 according to 35 U.S.C. § 119 (e), the contents of which are all incorporated herein by reference in their entirety.

FIELD OF THE INVENTION

The present disclosure relates to a method for assisting secured insertion of a multiple-use textual password identification, wherein the textual password is segmented into multiple secret segments. The method employs a number of encryption layers on top of the existing repeatable textual password identification, including a secret-keywords layer and a pictures layer and optionally a secret-questions layer, wherein each picture may be associated with multiple keywords.

BACKGROUND

The more individuals use and rely on computerized technologies such as personal computers, smart phones, tablets and other devices, the security of data obtained and used is more challenging. Many users of such technologies maintain and store sensitive information on their devices and protect entry to same by textual passwords. A large number of sites on the internet, as well as personal devices, require a personal password to enter thereinto, so that users have to memorize or otherwise store the passwords on their devices, which are, again, protected by a password to be more sophisticated and memorized etc.

A password should be known to an authorized user(s) only, wherein security should be maintained without leakage to unauthorized users and should be difficult to detect. However, passwords are made up of a combination of a finite number of alphanumeric characters and symbols/characters combinations thereof, and thus, have limited security.

Users or device owners are required to remember the characters string in order to input the password correctly in order to gain access to their device or data.

Many downfalls are present with this conventional characters-entry method: (1) difficult to memorize; (2) human error prone—keyboard typing is clumsy; (3) complicated screens/meta-keys (such as <SHIFT>,<ALT>,<CTRL>); (3) Confusing keyboard locale layouts.

Moreover, typing is a security hazard due to simplicity of password detection techniques, to name a few: (1) there are methods to record typing like, hardware key logger —a device attached to keyboard; software key logger, which runs on a computer (e.g. Windows XP); (2) surveillance cameras and many more.

There are challenges to secure secret passwords entry into vocal activated devices. As such, there is a continuing unmet need for a method of producing a password protecting secrecy and easily remember passwords.

There have been some attempts to attend to the above problems. US patent applications US20140359734, US20140059672 and US20160359839, by Alejandro V. Natividad, (herein referred to as "Natividad"). Natividad introduced a method for generating a changing (single use, changes in each and every login) authentication input or password for user to access a computing device, using recognizable objects displayed in positions on a graphic display such as images, that are displayed in sequential positions on a graphic display, and input strings of text or alphanumeric characters. The method is an integral part of the authentication system. Each object/icon is paired with a single keyword, typically an input string. The password is generated by placing the input strings in correct order as displayed (the method is also demonstrated in: http://nimbusid.com/). Typically, the object/icon is known (personally) to user (who has preconfigured to the authenticating application) and thus, it is difficult for a hacker to guess but easy for the user to remember. This solution is for a single-use password generated by the application, which is somewhat similar to "Captcha". The password is valid for one access session only, and is forgotten by the authentication, after each access. Natividad pairs an object with its respective single input string in a "static" configuration time as provided by the user.

In Natividad's series of patent applications, the method is an integrated part of the authentication process. The user, instead of entering a preset input strings of text or alphanumeric characters, receives a plurality of imaged objects, wherein at least one object is a recognizable object, and wherein the image of each recognizable object is associated with at least a portion of the expected alphanumeric password. The user then selects a sequence of such images with recognizable objects, which sequence of such recognizable objects are communicated to the authenticator.

WO2013129851 & US20150121489 introduced methods for enabling users to set their own secret icon or create graphical passwords from among a plurality of icons, by assigning one or more keywords to icons stored in a database. The user interface for setting icons enables user to input a keyword and enables all of the icons matching the inputted keyword to be displayed on a screen as a search result, and if no icon matches the inputted keyword, icons corresponding to the initial letter of the input keyword may be displayed on the screen as a search result and the user may select one of the icons. Such systems employ of continuous changing graphic user interface (GUI) as means for identifying the password and/or changing the password and providing means for user to identify it. Such systems may provide means for generating ever changing passwords for users, which can only be determined by user's predefined criteria, hence render hackers and identity thieves alike unable to obtain user information.

The above systems are complicated when requiring user to connect the meaning of icons or graphical passwords so as to create and memorize a phrase. Above systems, alleviates the need for character-based passwords. Modern systems rely on character-based passwords for (1) automated login for computer programs, (2) allowing remote login with no GUI, (3) shared authentication among team's members.

IL 253226 ("IL253226") patent application, by the present inventor, introduced a standalone method for entering a preset alphanumeric password, into a designated alphanumeric slot provided by an authenticator. IL253226 includes the first security layer of segmenting the alphanumeric password into a number of textual segments, as do the methods disclosed by Natividad, but unlike Natividad, each textual segment (first security layer) is associated with a secret keyword (second security layer) rather than with an image of a particular recognizable object. The secret keywords represent a second security layer, wherein each secret keyword can be associated with a plurality of images (third security layer). For each secret textual segment, a number of images are presented to the user, but, typically, only one image may be associated with the currently sought secret keyword.

It should be noted that IL253226 includes the first layer of the present disclosure, but does not include several substantial enhancements of the present disclosure. There is therefore a need and it would be advantageous to provide enhanced innovative concepts of keywords transformation to conceptual answers. For example, in IL253226 keywords are only words and concepts existing in commonly used language. It would be advantageous, security wise, to allow personal context, time context, location context and real time context (or a combination there of) to the password entry methodology, all of which provide additional security dimensions and layers.

In should be noted that IL253226 and Natividad require association of a string/keywords with a picture at configuration time.

The method disclosed herein, provides a solution to the shortcomings in prior art and achieves the above goals, by preserving the existing character-based password and transforming a password entry from keyboard characters selection to pictures selection. Also means to insert textual password into vocal systems with no GUI, no keyboard, or GUI system with no keyboard (smartphones, smart TV, car computer, ATM screens). For example, the method of the present disclosure facilitates the configuration of password—keywords—pictures at run time, without prior knowledge of the secret-keywords.

In view of the foregoing, there is a need for, and it would be advantageous to have a multi-layer secured and user-friendly method to enter a multiple-use password. The method should relieve the user from the need to remember complex alphanumeric passwords, on the one hand, and provide improved security and ease to remember, on the other hand.

SUMMARY

The term "user" as used herein refers to a human person interacting with the runtime-environment utilizing the password-entry system.

The term "consistent password" refers to a textual password identification that is consistent across many interactive sessions. Most secure runtime-environments provide consistent password to the user, and users are required to use the same password many times. This is in contrast with single usage passwords, which are passwords that are useful for one time only and become void after being used.

The terms "consistent password", "multiple-use password" and "repeatable password" are used herein interchangeably.

The term "runtime-environment" as used herein refers to the runtime environment in which the password-entry system is running. For example, the password-entry system is running inside a web-browser as a browser extension or web application, in which case the runtime-environment is the web-browser. In another example, the password-entry system is running on an Android tablet, in which case the runtime-environment is the Android operating system. In another example, the password-entry system is running on banking ATM machine, in which case the runtime-environment is the banking ATM machine.

A runtime-environment or application that restricts access to its data, using any form of authentication, is referred to as a "secured runtime-environment" provided by a "secured runtime-environment provider". The terms "secured runtime-environment provider" and "authenticator" are used herein interchangeably.

It is a principle intention of the present disclosure to provide a password-entry method for an end user that facilitates secure, consistent and repeatable secret password entry to the user interface. The secret password entry is user defined or optionally, authenticator defined, and can be changed at will. It is a further intention of the present disclosure to provide a password-entry system capable of executing the password-entry method.

It is a further intention of the present disclosure to provide a password-entry system that facilitates password entry to all secured runtime-environments relying on the runtime-environment. In other words, the disclosure is not limited to any specific secured runtime-environment and relies on the runtime-environment.

For example, if password-entry system is implemented in a web browser, then the password-entry system can be used to facilitate consistent password entry to all secured web runtime-environments that are implemented using standard web forms.

Another similar example, if the password-entry system is implemented in an Android TV technology, then the password-entry system can be used to facilitate consistent password entry to all secured Android TV runtime-environments that are implemented using the standard Android GUI technology.

It should be noted that the password-entry system of the present disclosure includes the realm of single use passwords, as the password-entry system usage can include automatic configuration changes of the textual password identification. The password-entry system can further provide a consistent list of secret-questions and secret-keywords for every changed password provided by the authenticator. Thereby, relieving the user from the need to know and memorize the changed password.

It should be further noted that while IL253226 and Natividad require association of a string/keywords with a picture at configuration time. The method of the present disclosure facilitates the configuration of password—keywords—pictures at run time, without prior knowledge of the secret-keywords.

It should be further noted that the password-entry system is not involved in the password authentication process (unlike Natividad's disclosures) handling, but rather only in password data entry. The secured runtime-environment is responsible for handling the authentication.

The password-entry system is not relaying, nor assuming a specific authentication process (unlike Natividad). The password-entry system is a facilitator for data entry in any secured password entry (no keyboard), including textual password identifications.

We use herein the term 'secret-keywords list' to identify an ordered list of keywords, where each keyword corresponds to a segment of the secret password (with zero or more characters). For example, a password "12ab" is segmented into an ordered list of secret password-segments {"1", "2a", "<NULL>", "b"}, each associated with a respective secret-keyword of the secret-keywords list {"cat":"1", "lift":"2a", "tree":" ", "nail": "b"}.

It should be noted that the actual segmentation of the textual password may take place at either the configuration stage or automatic, by the password-entry system, at runtime. However, the number of the segments and the order of the segments are set at the configuration stage.

In the present disclosure, as in IL 253226, the secret textual password identification is a given external input that is typically provided by the user. The password is provided as input when secret-keywords list is generated or requested. Password is considered a constant input and the password segments are stored along with the secret-keywords. The ordered secret-keywords list is associated with user and authentication-request source (such as, but not limited to: site, device, application, and network).

It should be noted that IL 253226 patent application "previous disclosure", by the present inventor, includes the second (secret-keywords) and third (images) layers of the present disclosure, but does not include several enhancements disclosed in the present disclosure, such as, with no limitations:

1. In the configuration stage, the previous disclosure the keywords relate to common knowledge. The present disclosure facilitates keywords that related to:
   a. the personal context of the user;
   b. time context; and
   c. location context.
2. The present disclosure facilitates usage of any type of words: nouns, verbs, adjectives, adverbs, etc.
3. The actual textual password segmentation can be performed at runtime, and is automatic, dynamic and user independent.
4. The present disclosure introduces an additional security layer (layer 1.5), by associating at least one secret-password-segment to a respective secret-question, and afterwards associating each secret-question to a respective secret-keyword.
5. The present disclosure facilitates secret-keywords computation or secret-keywords selection, in run time, when the correct secret-keyword is not known at configuration time.
6. The present disclosure facilitates incorporation of a second factor authentication as part of single password entry process.
7. The present disclosure facilitates partial password entry (for the more difficult part of the password or for a changing part of the password), allowing the user to combine keyboard entry with pictures selections.

The method disclosed herein adds more layers of encryptions above existing textual password identification: an ordered secret-questions, an ordered static or dynamic secret-keywords list and pictures.

The input device is primarily a textbox waiting for typing, but in the more general sense any input device waiting for user entry, such as, but not limited to a touch screen, a talking/listening device or a keyboard.

The process used by the method is complete when the secret textual password identification is entered by selecting a sequence of pictures selections.

According to the teachings of the present disclosure there is provided a consistent password-entry method for assisting insertion of a textual password identification, by a user, into an input device. The method includes a preliminary password configuration stage and a runtime stage, and runtime-environment, that is initiated upon an authentication request from an authenticator.

The preliminary password configuration stage includes:
a) activating a password-entry system;
b) receiving from the user or from a secured runtime-environment, by the password-entry system, a textual password having M characters, wherein the characters are selected from the set of common keyboard character entries;
c) by the password-entry system, presenting the user with one or more lists, each having a plurality of candidate secret-keywords;
d) selecting, by the user, N secret-keywords from the presented candidate secret-keywords;
e) segmenting the password space into N vacant-password-placeholders, by the password-entry system;
f) orderly associating each of the vacant-password-placeholders with a respective secret-keyword from the N selected secret-keywords, forming an ordered list of secret-keywords; and
g) saving the pairs of the vacant-password-placeholder and respective secret-keyword in an addressable memory storage location accessible to the password-entry system, At the runtime stage, upon receiving an authentication request from a user or an authenticator, the method proceeds with the following steps:
a) activating the password-entry system, by either the user or automatically;
b) by the password-entry system, (i) retrieving the received textual password; and (ii) retrieving the ordered list of associated pairs of the vacant-password-placeholder and respective secret-keyword from the memory storage location;
c) segmenting the textual password into N password-textual-segments, by the password-entry system;
d) orderly populating, by the password-entry system, each of the vacant-password-placeholder with a respective password-textual-segment, being associated with a respective secret-keyword;
e) presenting the user with a group of K pictures, wherein of each of the K pictures associated with at least one pre-selected candidate keyword by the password-entry system, and wherein only Q pictures of the presented group of pictures represent the currently sought secret-keyword, in the ordered list of secret-keywords, and wherein $K \gg Q$, $N \geq Q$ and $Q>0$. Q is an integer and $Q \geq 1$. Typically, $K>Q*5$;
f) selecting, by the user, a picture representing the currently sought secret-keyword;
g) verifying, by the password-entry system, that the selected picture represents the currently sought secret-keyword from the selected picture;
h) entering into the input device, by the password-entry system, the password-textual-segment associated with the identified currently sought secret-keyword; and
i) repeat runtime steps (e)-(h) until the user or the password-entry system select to return control to runtime-environment.

The password-entry system can be activated by either the user or by the secured runtime-environment provider, being the authenticator.

Typically, the parameters selected from the group of parameters consisting of N, K, Q and others are configurable.

Typically, picture, in a presented group of pictures, is associated with a minimum of L keywords, and thereby, the minimum number of keywords associated with a presented group of K pictures is K*L keywords.

The secret-keywords are selected from the group of conceptual words, including objects, states of an object, creatures, events, verbs, locations, monuments, adjectives, adverbs, time, characters, symbols, graphics and combinations thereof.

The process of verifying that the selected picture represents the currently sought secret-keyword includes: (a)

determining, by the password-entry system, from the selected picture, if the selected picture represents the currently sought secret-keyword; and (b) upon determining that the selected picture does not represent the currently sought secret-keyword, entering incorrect symbols into the input device, by the password-entry system, and returning to the runtime step (e) by presenting the user with a group of K pictures.

The steps of retrieving the pairs of the vacant-password-placeholder and respective secret passwords secret-keyword from the memory storage location; segmenting the textual password into N password-textual-segments; and orderly associating each of the vacant-password-placeholder with a respective password-textual-segment (and thereby with a respective secret-keyword), can be performed at the preliminary password configuration stage.

Optionally, the textual password is a multiple-use password.

The password-textual-segment length ranges from NULL to S symbol characters, wherein S≤M.

The parameter S can be configurable.

Typically, the password-entry system selects to return control to runtime-environment upon determining that all N secret password-textual-segments have been orderly entered into the input device.

Optionally, at the password configuration stage, the selecting of at least one of the selected secret-keywords includes selecting a conceptual secret-question, wherein the expected response to the selected conceptual secret-question is associated with the selected secret-keyword.

Optionally, the secret conceptual question has been indirectly associated with the selected picture during the password configuration stage, being both associated with the selected secret-keyword.

The response to each of the conceptual secret-questions is selected from the group of concepts including objects, states of an object, creatures, events, verbs, locations, monuments, adjectives, adverbs, time, characters, symbols, graphics and combinations thereof.

It should be appreciated that a picture and/or a secret-keyword can be associated with a plurality of secret-questions.

It should be further appreciated that a picture and/or a secret-keyword can be associated with a secret-question regardless of the objects depicted in the particular picture.

It should be further appreciated that a picture can be associated with a question within a recent time context, and wherein the recent time context is selected from a group of time periods including a fraction of an hour, an hour, a day, a number of days, a week, a number of weeks, a month, a number of months, a year, a lifecycle stage, a season, an era, a number of years and a combination thereof.

It should be further appreciated that the response to a conceptual question is determined in real time by the password-entry system. The determining of the response in real time may be performed using a remote IOT (Internet-Of-Things) sub-system that is interfaced to the password-entry system by an IOT module. Optionally, the determining of the response in real time is performed using an IOT sub-system of the password-entry system.

The password entry system can be used to respectively enter a portion of the textual password into at least one pre-determined vacant-password-placeholder. Optionally, at least one pre-determined vacant-password-placeholder is determined in the runtime stage. Optionally, the position of at least one pre-determined vacant-password-placeholder, within the textual password is determined in the runtime stage.

The preliminary password configuration stage can further include at least one method of memorizing a hint phrase representing the ordered list of secret-keywords or list of expected responses.

The received password is received in the runtime stage from the secured runtime-environment, wherein the received textual password may be hidden from the user.

The user may be presented with K text-frames instead of K pictures, wherein each of the K text-frames is associated with at least one pre-selected candidate keyword by the password-entry system, wherein the user select a text-frame representing the currently sought secret-keyword, and wherein only Q text-frames of the presented group of text-frames represent the currently sought secret-keyword, in the ordered list of secret-keywords, and wherein K>>Q, N≥Q and Q>0.

The password-entry system may include a textual user interface or a vocal user interface for presenting the text-frames. It should be appreciated that the password-entry system may include a runtime population-algorithm known to the user, and wherein the runtime population-algorithm is configured to populate candidate keywords into respective text-frames.

It should be further appreciated that the runtime population-algorithm is configured to assisting the user to estimate which text-frame is a good candidate for selection.

Optionally, when the password-entry system presents a group of pictures for the user to select the currently sought secret-keyword, the password-entry system further presents a refresh button, wherein when the user activates the refresh button the password-entry system presents another group of pictures, wherein the newly picture that is associated with the currently sought secret-keyword is preferably different from previously presented picture that is associated with the currently sought secret-keyword.

The method is best explained by an example. The examples hereunder are intended to be illustrative and not exclusive, and they do not imply any limitations on the invention described and claimed herein. Various limitations of the related art will become apparent to those skilled in the art upon a reading and understanding of the specification below and the accompanying drawings.

An embodiment is an example or implementation of the disclosures such as, but not limited to a GUI screen. The various appearances of "one embodiment," "an embodiment" or "some embodiments" do not necessarily all refer to the same embodiments. Although various features of the disclosure may be described in the context of a single embodiment, the features may also be provided separately or in any suitable combination. Conversely, although the disclosure may be described herein in the context of separate embodiments for clarity, the disclosure may also be implemented in a single embodiment.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the disclosures. It is understood that the phraseology and terminology employed herein is not to be construed as limiting and are for descriptive purpose only.

In one embodiment, textual password preparation input is given as a secret textual password. The secret password is segmented into N segments, wherein each password segment is associated with single secret-keyword, forming an ordered list of N secret-keywords selected by the user. The user remembers the list of the secret-keywords in the correct order. The user may use a hint phrase containing the ordered list of N secret-keywords, to help him/her to remember the ordered list of secret-keywords. It should be noted that each password segment is associated with a single secret-keyword or with a secret-question that is associated with that secret-keyword.

In another embodiment, the textual password-entry system uses pictures, wherein the password-entry system includes a repository of candidate pictures having an addressable memory location; each candidate picture may represent one or more associated keywords. For each associated secret-keyword or a corresponding secret-question in the ordered list of N password segments, a password segment is associated therewith. However, the actual segmentation of the textual password may take place at either in the configuration stage or at runtime. At runtime, the user receives a computer-generated list of pictures, wherein, typically, only one of the pictures represents the currently sought secret-keyword or the corresponding answer to a respective secret-question in the ordered list N password segments. The user is expected to select the correct picture that represent the currently sought keyword (or the correct answer to the corresponding secret-question) in the ordered list N password segments. Upon selecting the correct picture, the system identifies the correct, currently sought secret-keyword or the correct answer that is associated with the selected picture, and therefore with the correct textual password segment, associated with that correct secret-keyword (or the correct answer), which textual password segment is inserted into corresponding password entry place. It should be noted that when selecting an incorrect picture yields an incorrect entry of the corresponding password segment.

BRIEF DESCRIPTION OF THE DRAWINGS

The present disclosure will become fully understood from the detailed description given herein below and the accompanying drawings, which drawings are generally not drawn to scale and are given by way of illustration only and thus, not limitative of the present disclosure, and wherein.

DETAILED DESCRIPTION

The present disclosure will now be described more fully hereinafter with reference to the accompanying drawings, in which drawings show example embodiments of the disclosure. Present disclosure may, however, be embodied in many different forms and should not be construed as limited to the embodiments set forth herein; rather, these embodiments are provided, so that this disclosure will be thorough and complete, and will fully convey the scope of the disclosure to those skilled in the art.

Unless otherwise defined, all technical and scientific terms used herein have the same meaning as commonly understood by one of ordinary skill in the art to which the present disclosure belongs. The methods and examples provided herein are illustrative only and not intended to be limiting.

The goal of the hereunder described method is to assist users in inserting a password into an input device. Commonly, multiple-use passwords consist of symbols, being keyboard characters, chosen by a user in a particular sequence. Commonly, the user is required to remember the sequence of keyboard characters. The method prevents hostile people and/or processes from overlooking the password entry process, i.e. reading the keyboard keys being typed during the password entry process. The method can further provide an alternative for a keyboard device or for any other means for entering text.

It is an aspect of the present disclosure to provide a method for assisting users to securely insert a multiple-use (repeatable) password, wherein, in a configuration stage, the textual password, consisting a particular sequence ofM symbols, is segmented into multiple segments either by the user or by an algorithm. The method facilitates employment of a number of layers of encryptions on top of the existing repeatable textual password, including a password-segments layer, a secret-questions layer, a secret-keywords layer, wherein the answer to each secret-question is associated with a secret-keyword, which in turn is associated with a respective password segment. The method further facilitates employing a pictures layer, wherein each picture may be associated with multiple keywords.

The password entry method of the present disclosure facilitates conversion of a meaningless password into a meaningful list of secret-keywords, which may be, but not limited to, nouns and/or verbs.

Figure 1A:
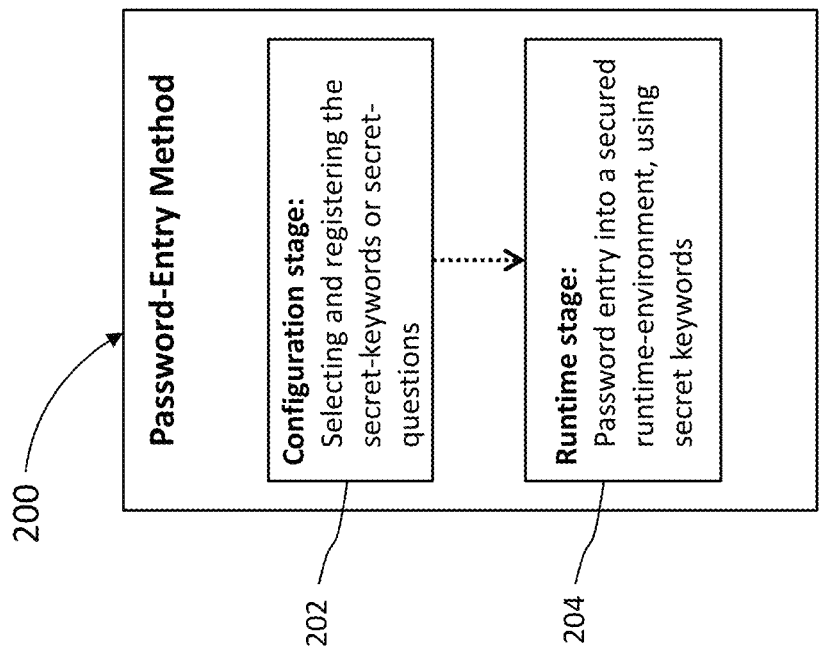
FIG. 1a is a flow diagram illustration of a password-entry method for assisting secure insertion of a password in an input device, according to aspects of the present disclosure.

FIG. 1a is a flow diagram illustration of a password-entry method 200 for assisting secure insertion of a password into an input device, wherein password-entry method 200 includes a preliminary password configuration stage 202 and a runtime password entry stage 204.

Figure 1B:
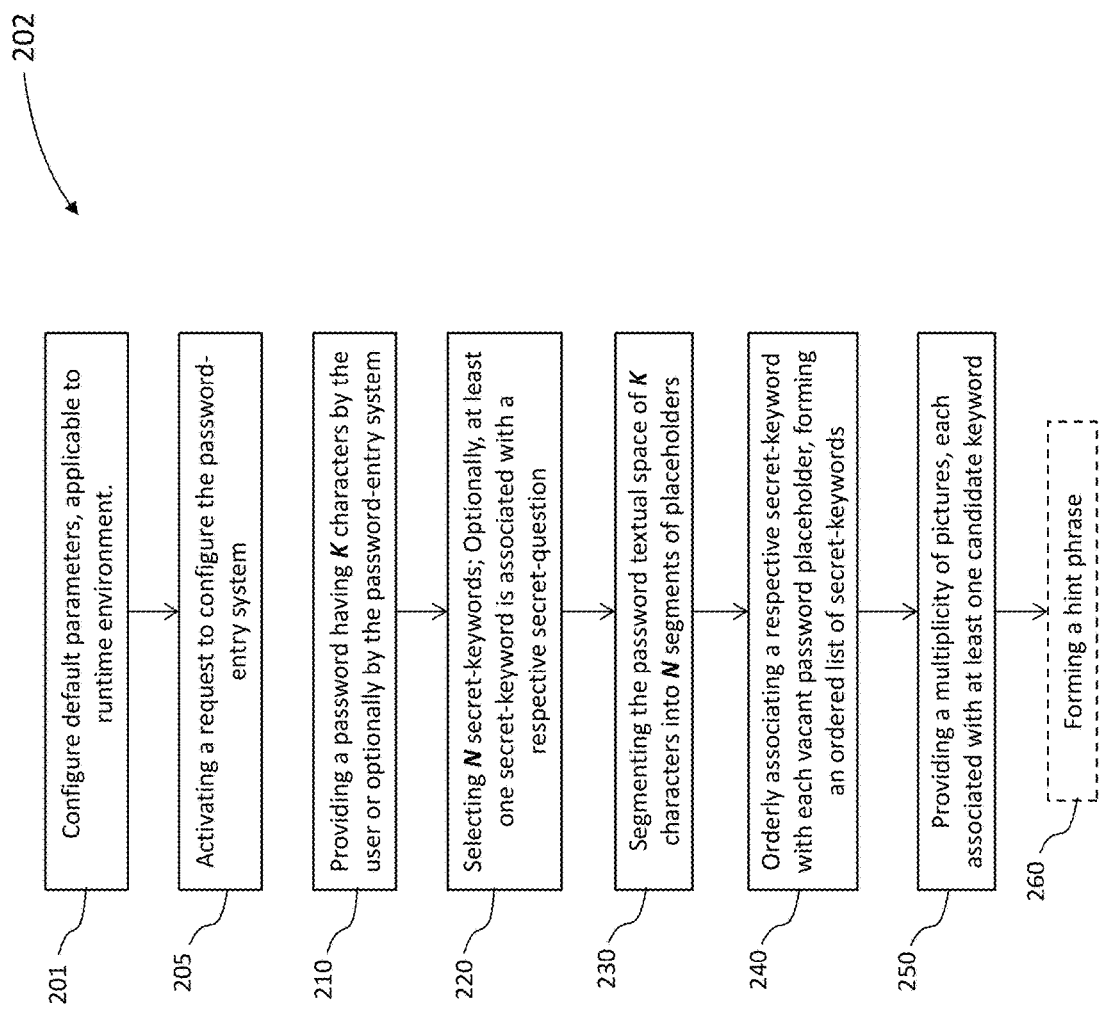
FIG. 1b is a flow diagram illustration of the preliminary password configuration stage of the password-entry method, according to aspects of the present disclosure.
Figure 1C:
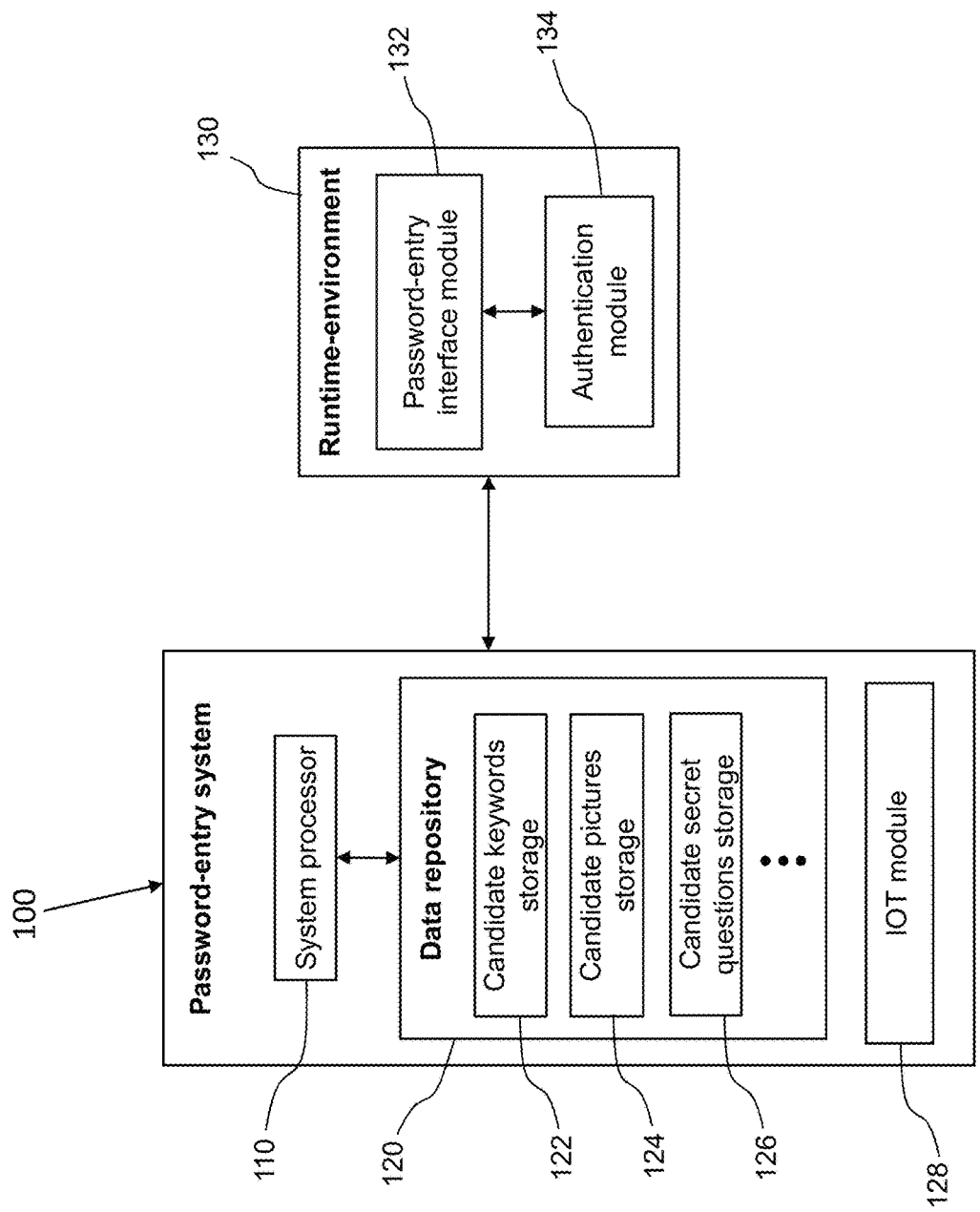
FIG. 1c is a system diagram illustration of a password-entry system for assisting secure insertion of a password in an input device, according to aspects of the present disclosure.

In one embodiment, FIG. 1b is a flow diagram illustration of the preliminary password configuration stage 202 of the password-entry method 200, commencing in step 205 of the preliminary password configuration stage 202 of password-entry method 200. FIG. 1c illustrates a password-entry system 100 for assisting secure insertion of a password in an input device, according to aspects of the present disclosure. In step 205, either the user or an authenticator, such as a secured runtime-environment 130 provider, provides an ordered sequence of M symbols/characters, complying with the requirements of the secured runtime-environment 130, which secured runtime-environment 130 is enrolled to operate with a password-entry system 100. Password-entry system 100 includes a system processor 110 and a data repository 120 that includes non-volatile physical media, implemented in technology for storage of information.

Figure 2A:
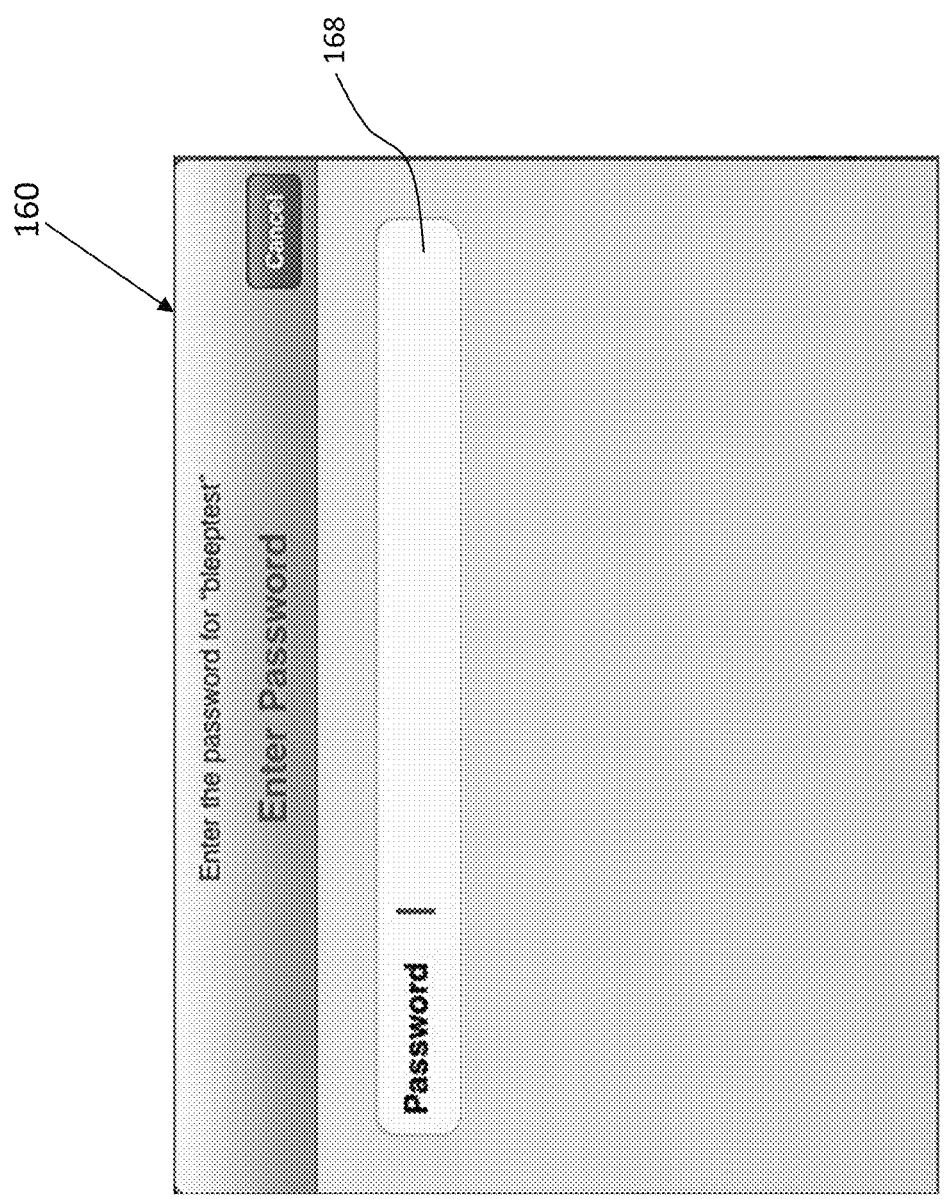
FIG. 2a depicts an example text input means provided by a secured runtime-environment.
Figure 2B:
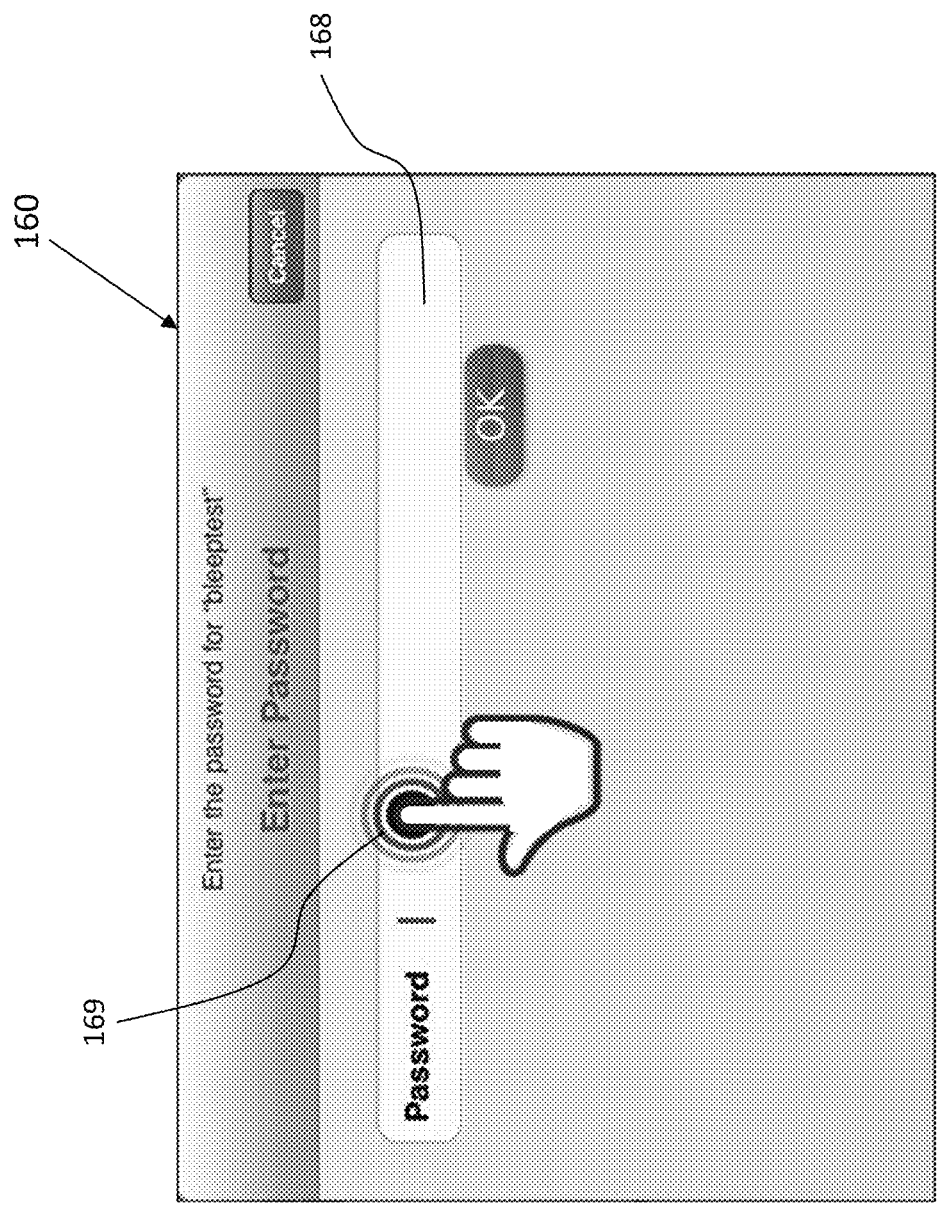
FIG. 2b depicts an example activating method of the password-entry system.

Password-entry system 100 is configured to interact with a password-entry interface module 132 of the secured runtime-environment 130, and with an authentication module 134 integrated there-within the secured runtime-environment 130. It should be appreciated that password-entry interface module 132 is responsible to signal/notify password entry system 100 that an authentication is required (as in step 280 of the runtime password entry stage 204, see FIG. 7). Typically, the user activates a request to interact with password-entry system 100, in step 205. For example, as illustrated in FIGS. 2a and 2b, the user can double click (169) on a text input means 168, provided in a runtime-environment interface 160 by the runtime-environment provider, or, in one alternative, do a long press on the text input means 168. Optionally, the runtime-environment provider can activate the password-entry system 100 to interact there-with, without the user having to activate the system.

Figure 2C:
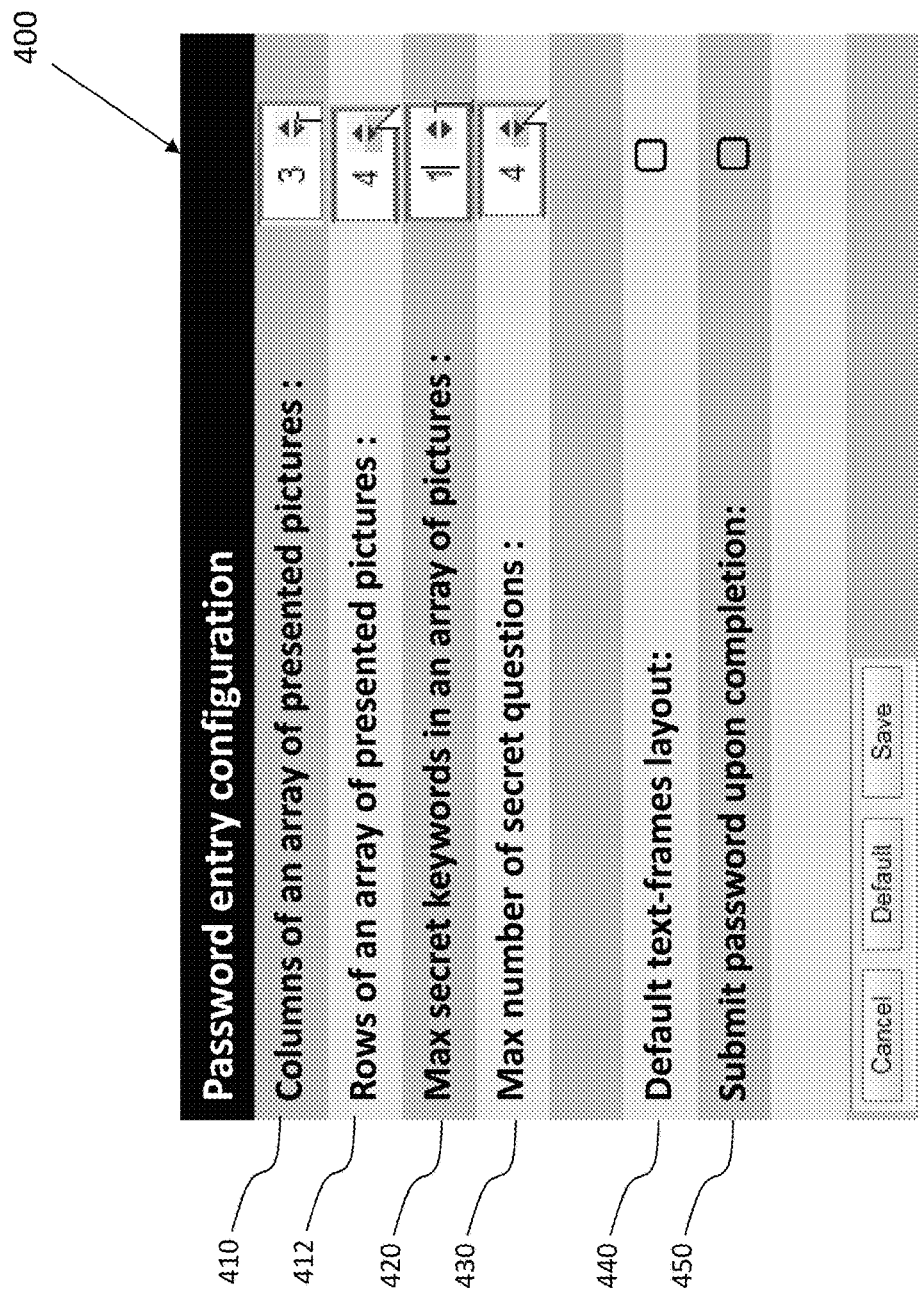
FIG. 2c depicts an example embodiment for configuring operational properties and parameters of a password entry system.

It should be noted that a variety of configuration parameters may be pre-set by the password-entry system 100. However, some or all of the configurable parameters may be set by the user (step 201), as exemplified, with no limitations, in an example configuration frame 400 that is depicted in FIG. 2c. For example, without limitations, the following configuration parameters may be set as follows:

S, The maximum number of characters per password segment (not shown).

Figure 6A:
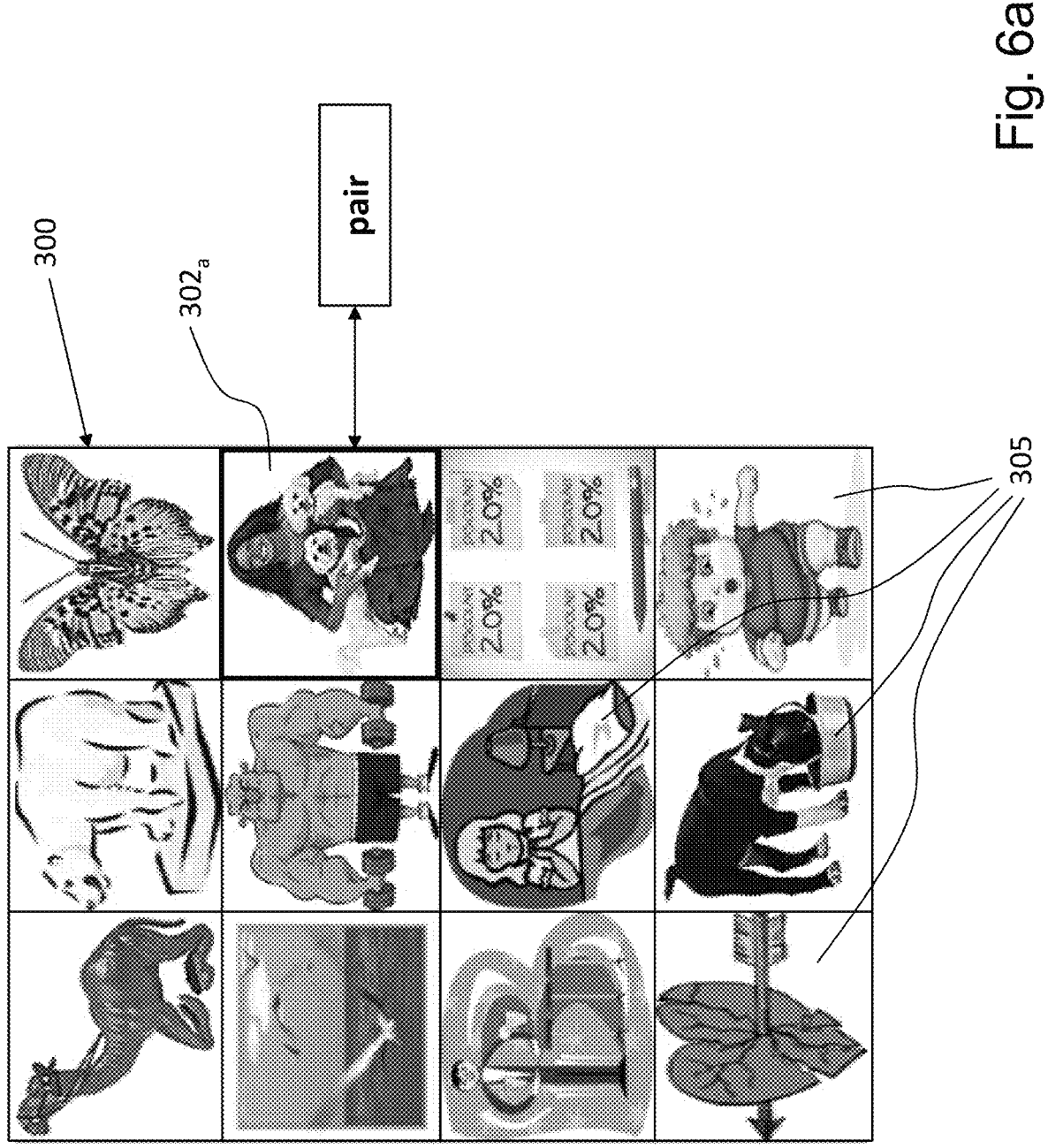
FIGS. 6a-6d depicts, by way of example only and with no limitations, 4 different groups of pictures being presented to the user, from which groups the user orderly selects the pictures that he thinks represent the sought secret-keywords.

K, the number of pictures 305 (see for example FIG. 6a) in a presented layout group 300 (see for example FIG. 6a).

The number of columns in a presented layout group 300 of pictures 305. (3 in the example depicted in FIG. 2c, item 410).

The number of rows presented pictures 305 layout group 300, wherein this parameter is shown as item 412 and is set, by way of example only, to 4.

Q, the maximum number of secret-keywords (150) in a pictures-layout-group 300 of pictures 305, wherein this parameter is shown as item 420 and is set, by way of example only, to 1.

N, the maximum number of configured secret-questions or secret-keywords 155, wherein this parameter is shown as item 430 and is set, by way of example only, to 4.

Figure 10:
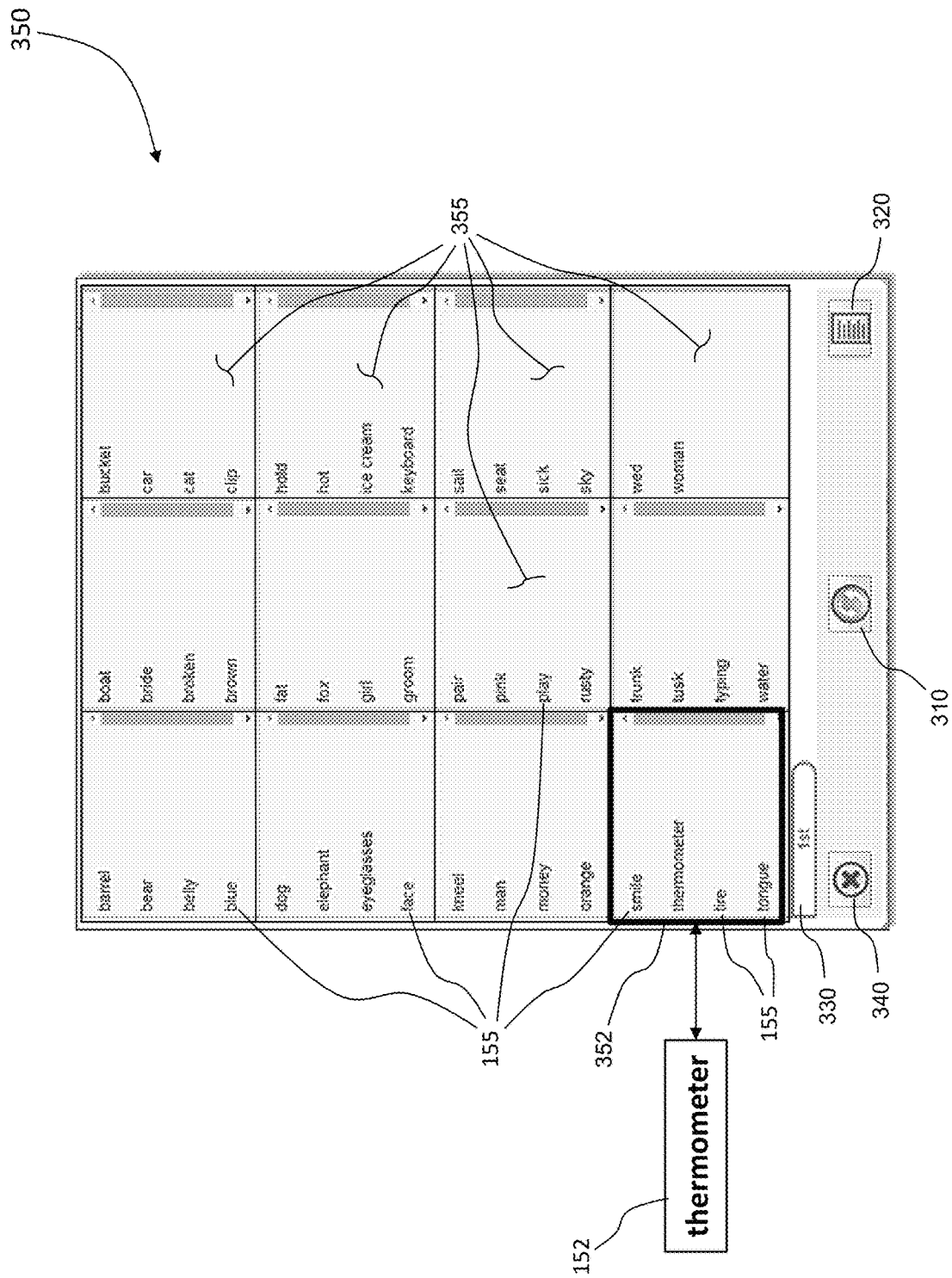
FIG. 10 depicts a sample text mode layout, from which text mode layouts the user can orderly select sought secret-keywords for inserting a password, using textual or vocal keywords layout.

A checkbox 440 to set the default layout display to be in the text-frame mode layout (350 and not pictures, see for example FIG. 10).

A checkbox 450 to guides password-entry system 100 to submit the password to the secured runtime-environment provider.

Etc.

The preliminary password configuration stage 202 of password-entry method 200 proceeds with the following steps (see for example FIG. 1b):

Step 210: providing a textual password.

Figure 3A:
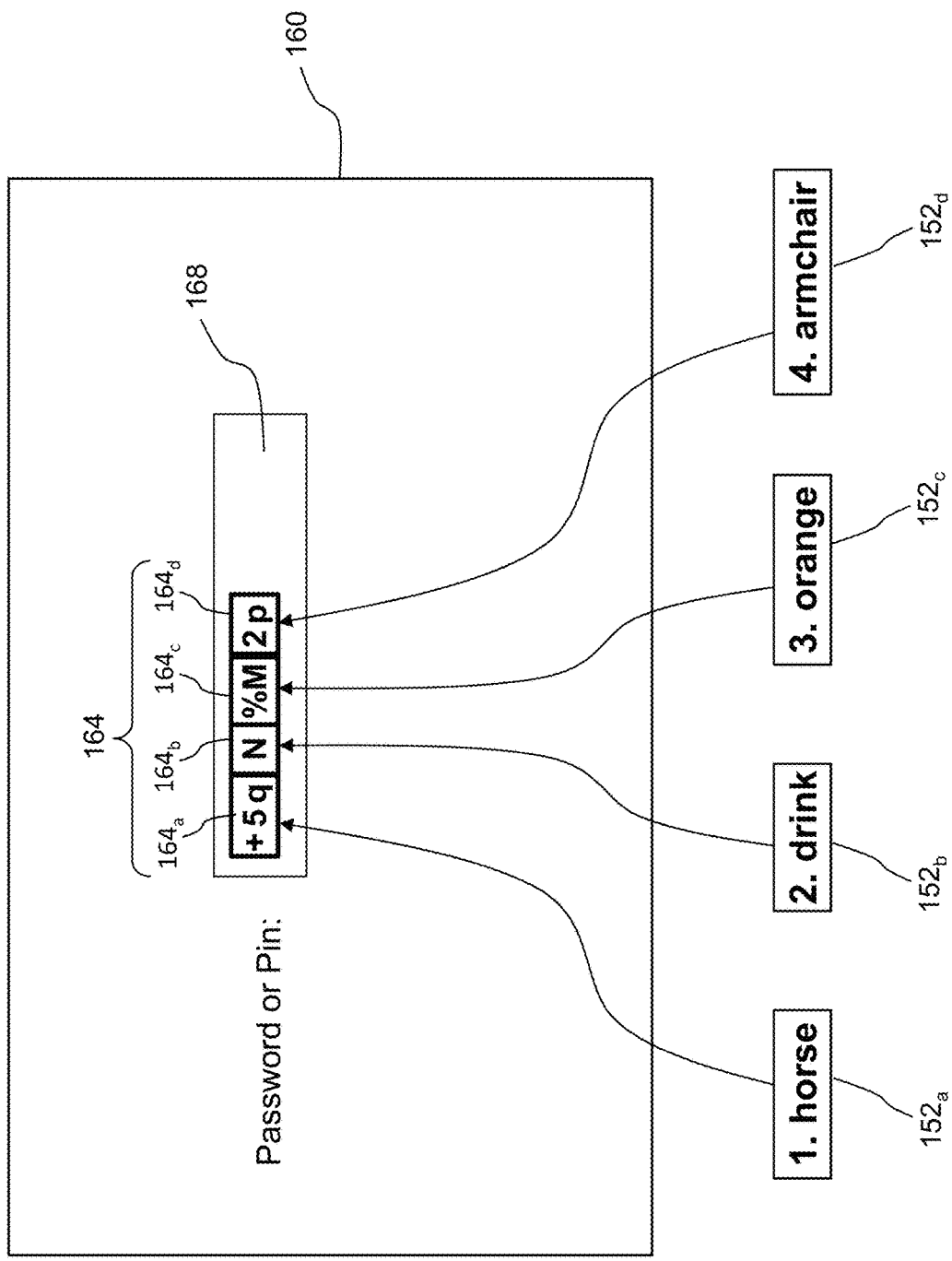
FIG. 3a illustrates textual password segmentation, and associating each password segment with a secret-keyword.

Password-entry system 100 displays, for example, a password configuration form 160, as exemplified, with no limitations, in FIG. 3a, containing a textual data entry mean 168. Typically, the user feeds the textual secret password (via an input device such as a keyboard). Optionally, when password-entry system 100 is integrated with authentication module 134, authentication module 134 can automatically feed the textual secret password into data entry mean 168.

Step 220: selecting N secret-keywords.

The password-entry system 100 presents the user with one or more lists 150 (FIG. 3b) having a plurality of candidate secret-keywords 155 (see FIG. 3b) that are fetched for example from a candidate keywords storage 122 in an addressable location of data repository 120, using system processor 110 of password-entry system 100. The user then selects an ordered list of secret-keywords 152 (see FIG. 3c) from the candidate secret-keywords 155. Typically, the selection of secret-keywords is concluded when the ordered list of secret-keywords consists all of the N selected secret-keywords 152. It should be noted that the that the secret-keywords can be either static or dynamic, wherein the secret-keywords are selected from the group of concepts including: objects, states of an object, creatures, events, verbs, locations, monuments, adjectives, adverbs, time, characters, symbols, graphics and combinations thereof An example is presented in FIG. 3b, showing an example runtime-environment interface 160, wherein an example of a partial list 150 of candidate secret-keywords 155 is shown.

Figure 3B:
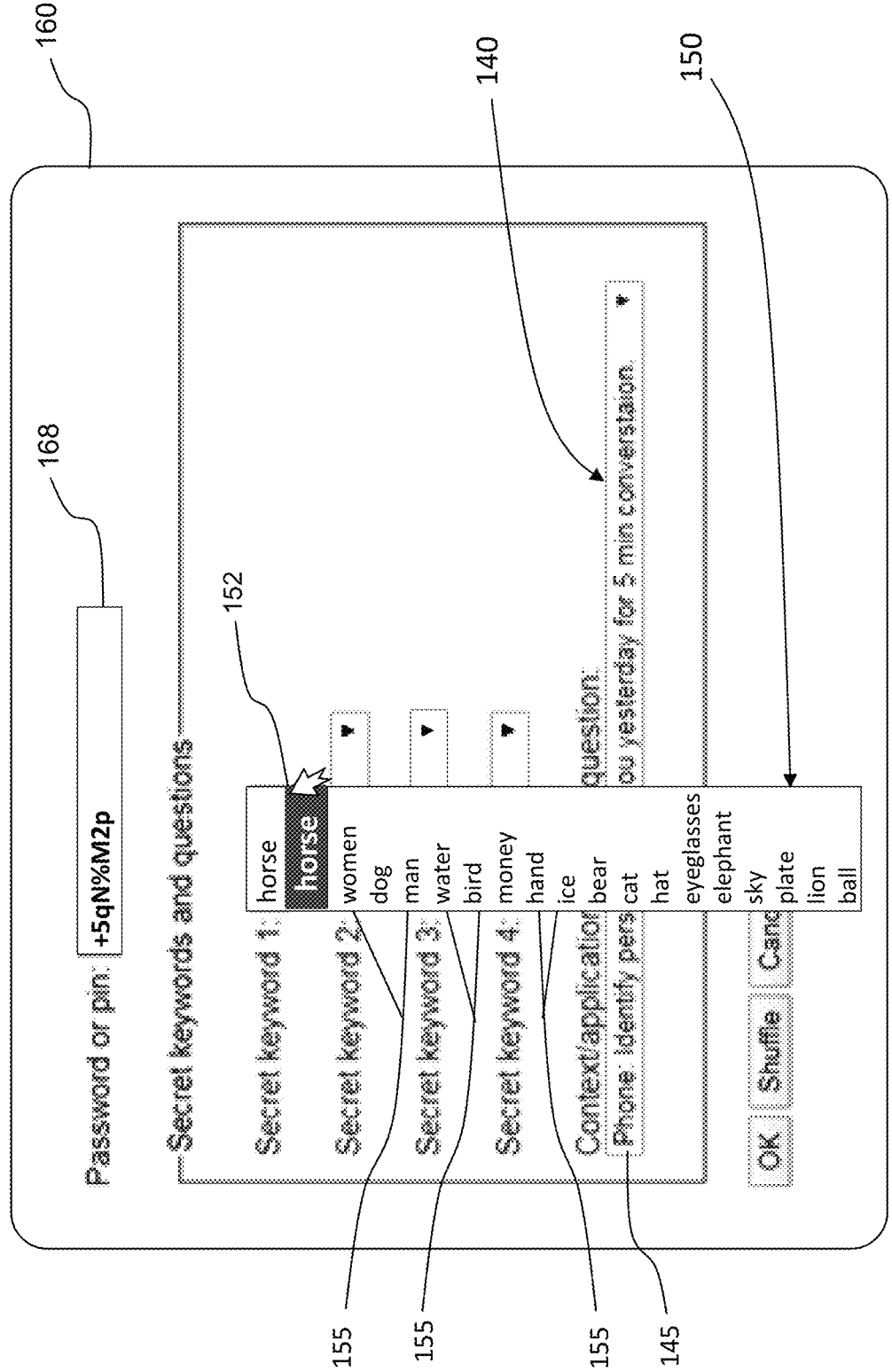
FIGS. 3b and 3c depicts a sample embodiment for configuring an example textual password with an ordered list containing 4 secret-keywords and 1 secret-question.

FIGS. 3a and 3b, show an example runtime-environment interface 160 facilitating the configuration of a password, wherein the text input means 168, as shown in this example, hosts an example visible password that was selected by a user or by the authenticator. In this example, with no limitations, N=4. It should be noted that the numbers used in the examples of the present disclosure are arbitrary and are chosen for illustrative purposes only in a non-limiting manner. It should be further noted that the parameter N can be set by the user in step 201 of the configuration stage 202, or at the runtime stage, according to the N parameter 430 as shown in the example depicted in FIG. 2*c*.

In the example shown in FIG. 3*a*, the user has selected a first secret-keyword 152$_a$ "Horse"; a second secret-keyword 152$_b$ "Drink"; a third secret-keyword 152$_c$ "Orange"; and a fourth secret-keyword 152$_d$ "Armchair".

The second encryption layer is established (not completed).

Figure 4A:
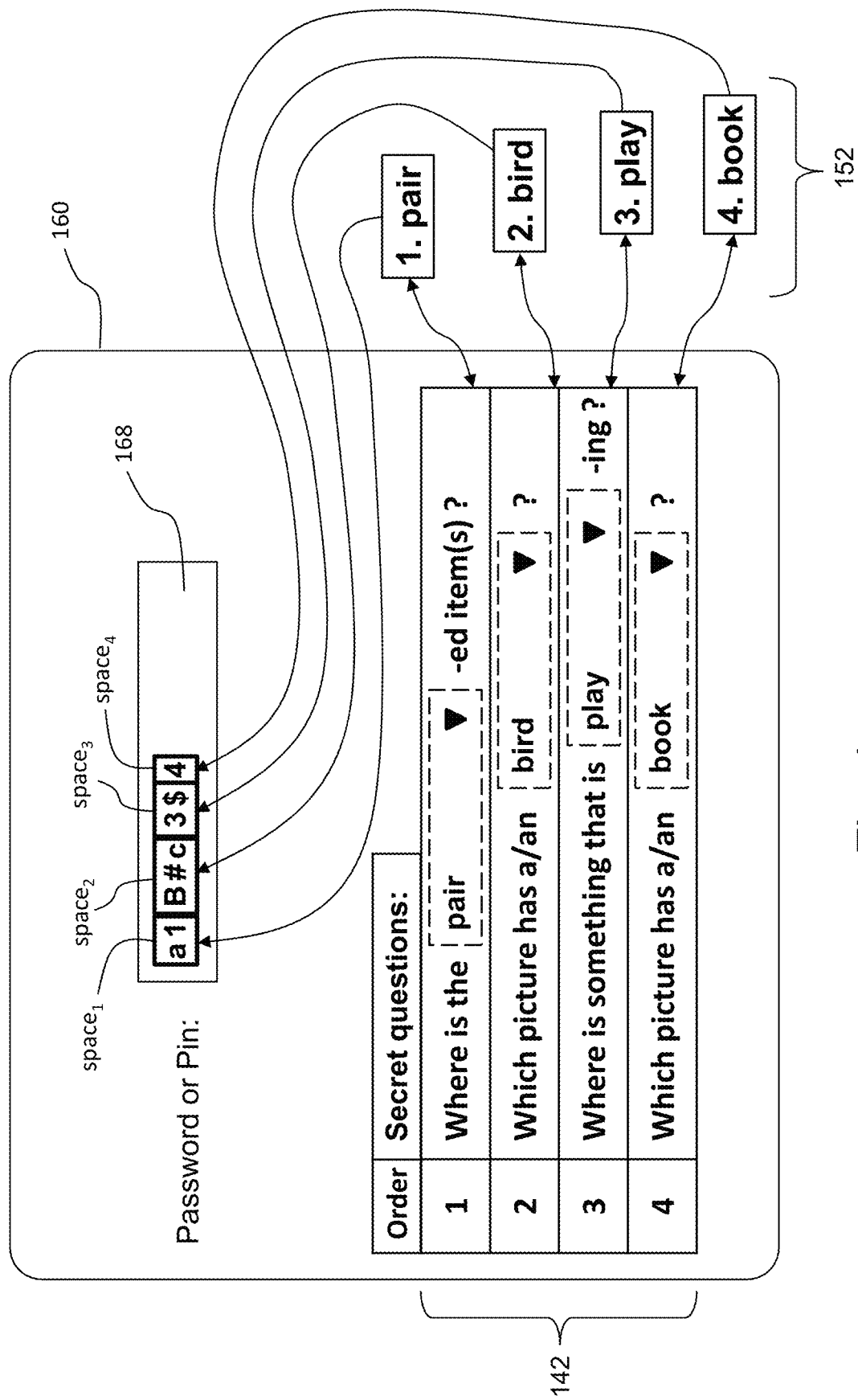
FIG. 4a depicts sample embodiment for configuring another example textual password with an ordered list of 4 secret-questions, and demonstrating the association of each secret-keyword with a respective secret-question and a respective password segment.
Figure 4B:
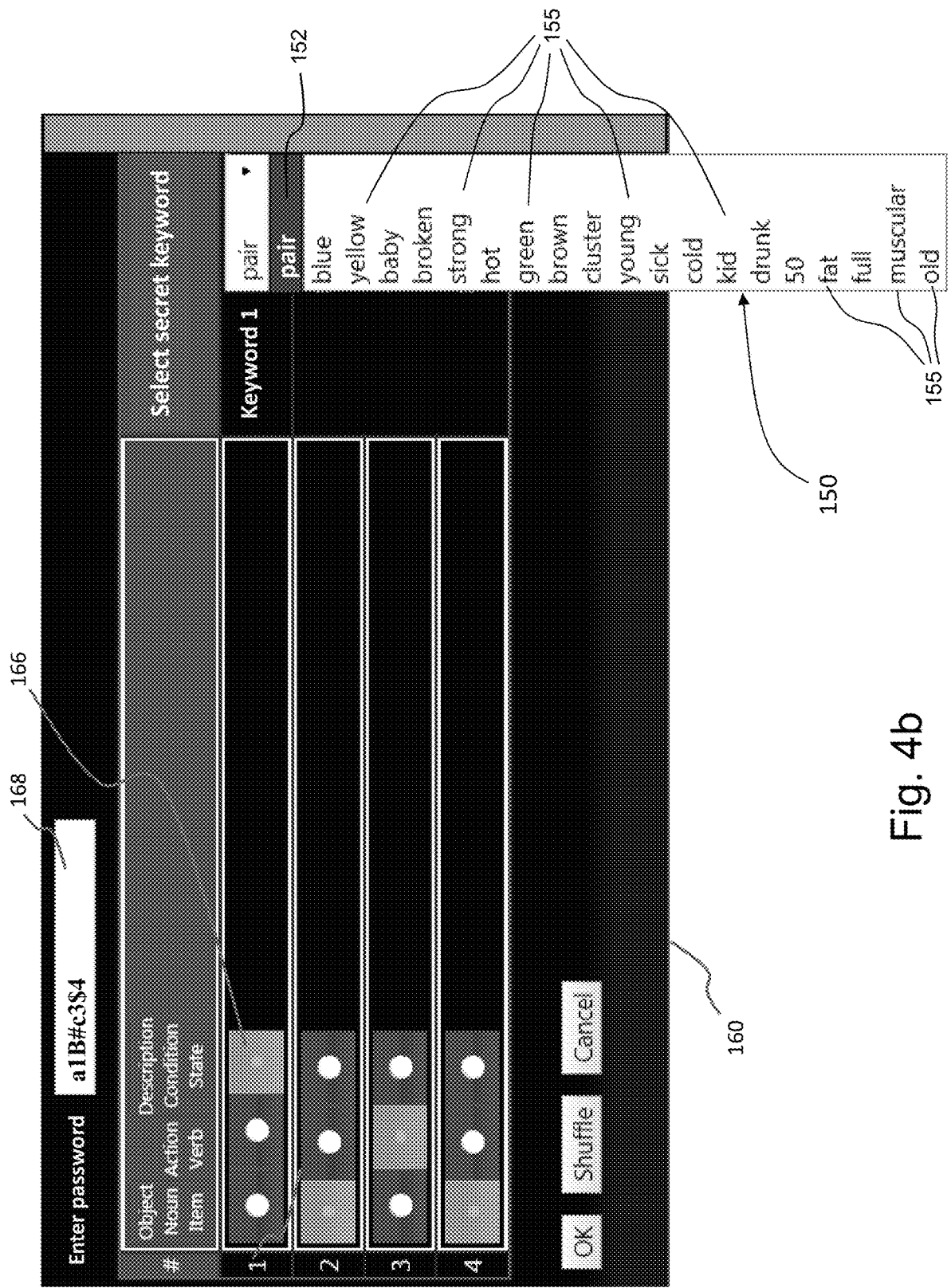
FIGS. 4b-4e demonstrate a sample embodiment usage scenario, for configuring a textual password with an ordered list of 4 secret-keywords, wherein the secret-keywords are selected from respective lists of secret-keywords from selected categories.
Figure 4C:
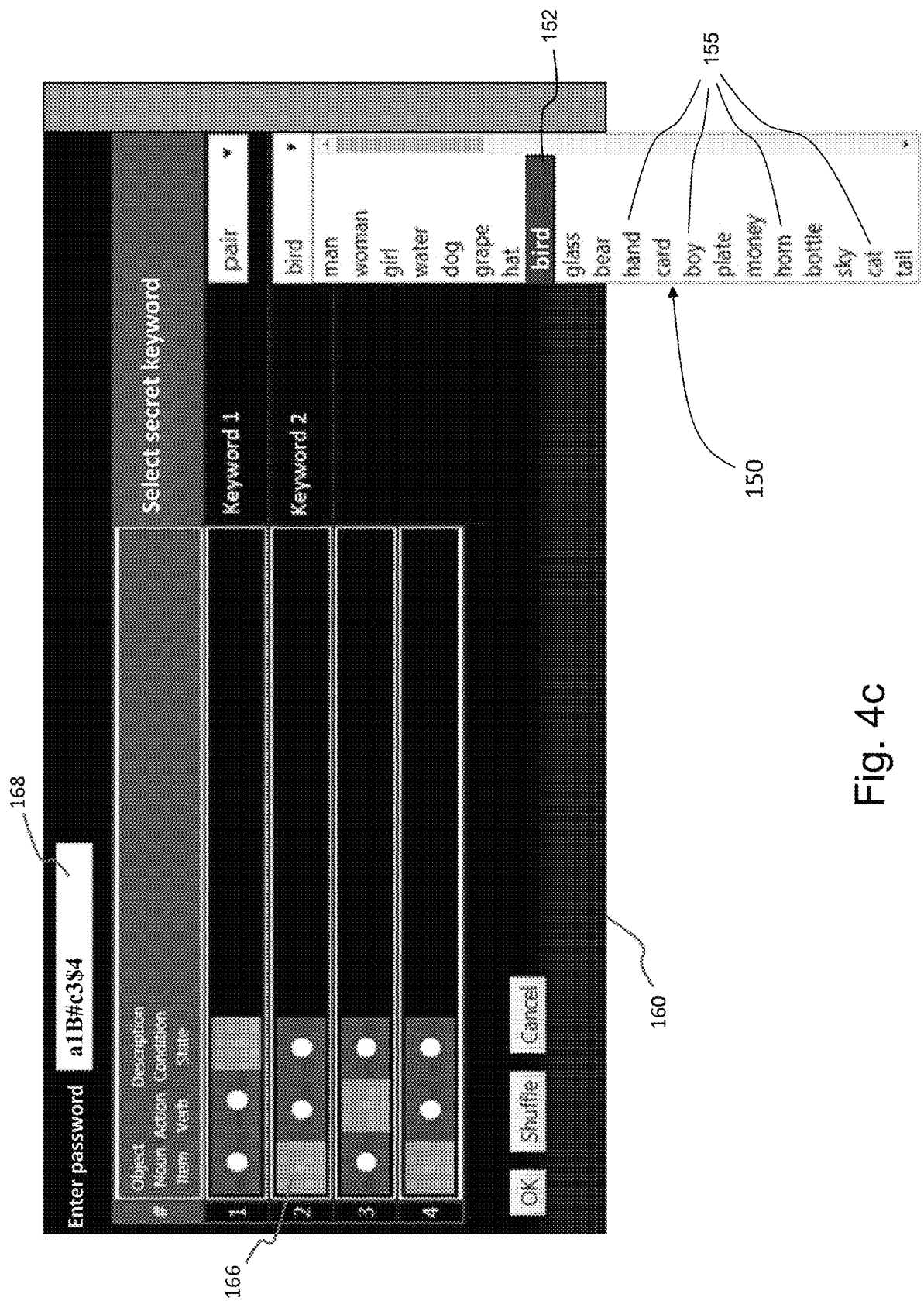
Figure 4D:
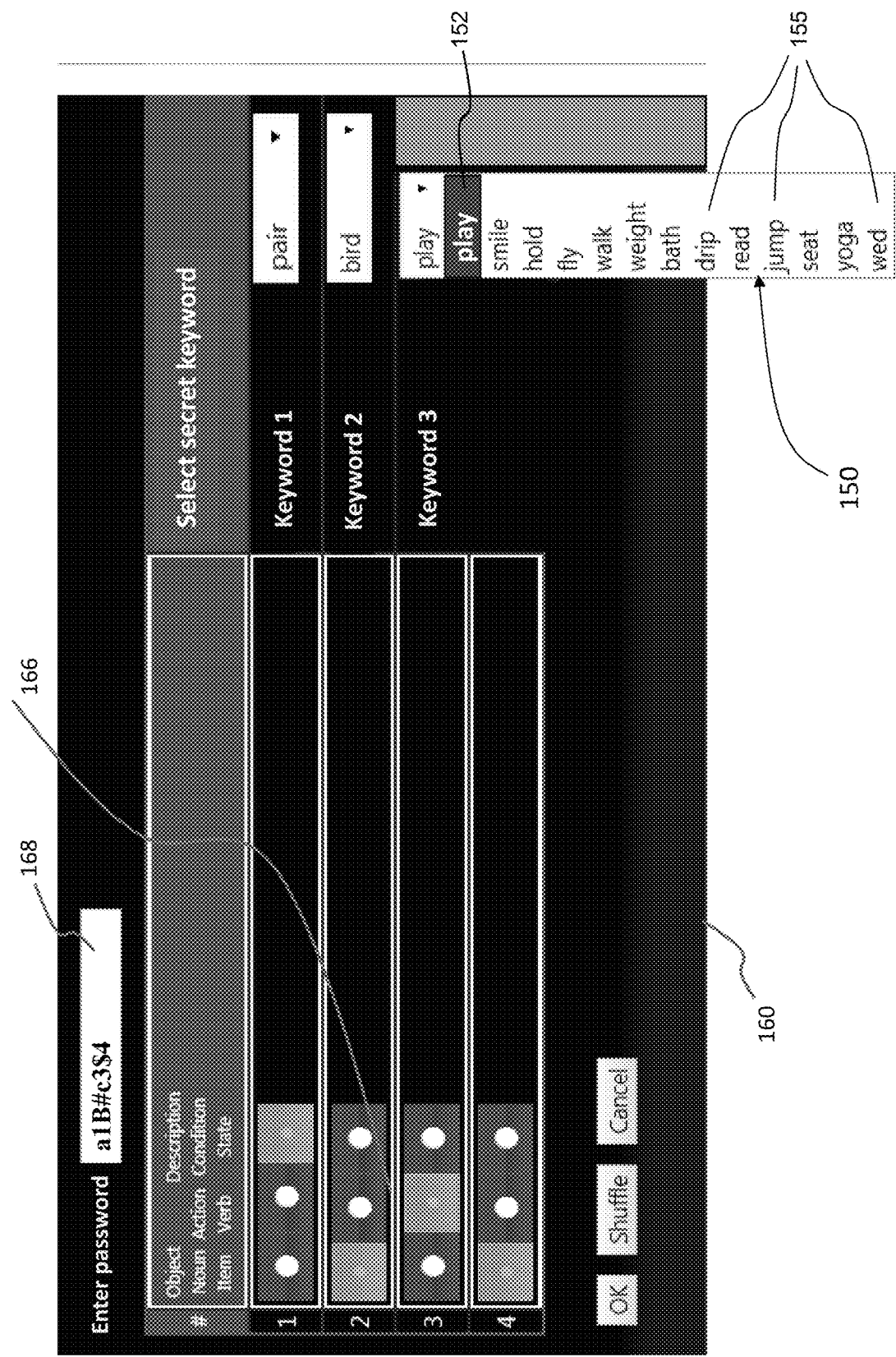
Figure 4E:
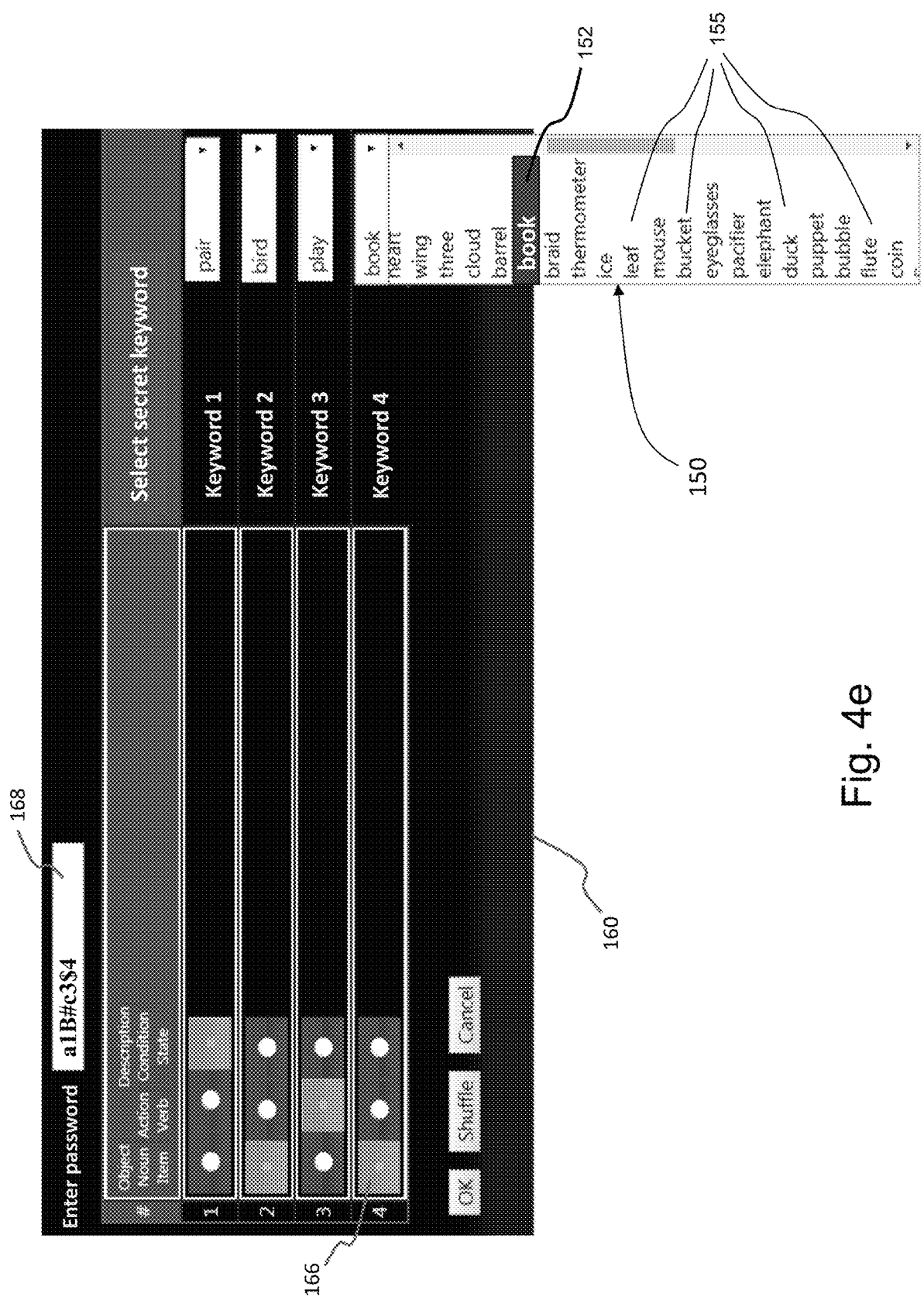
Figure 4F:
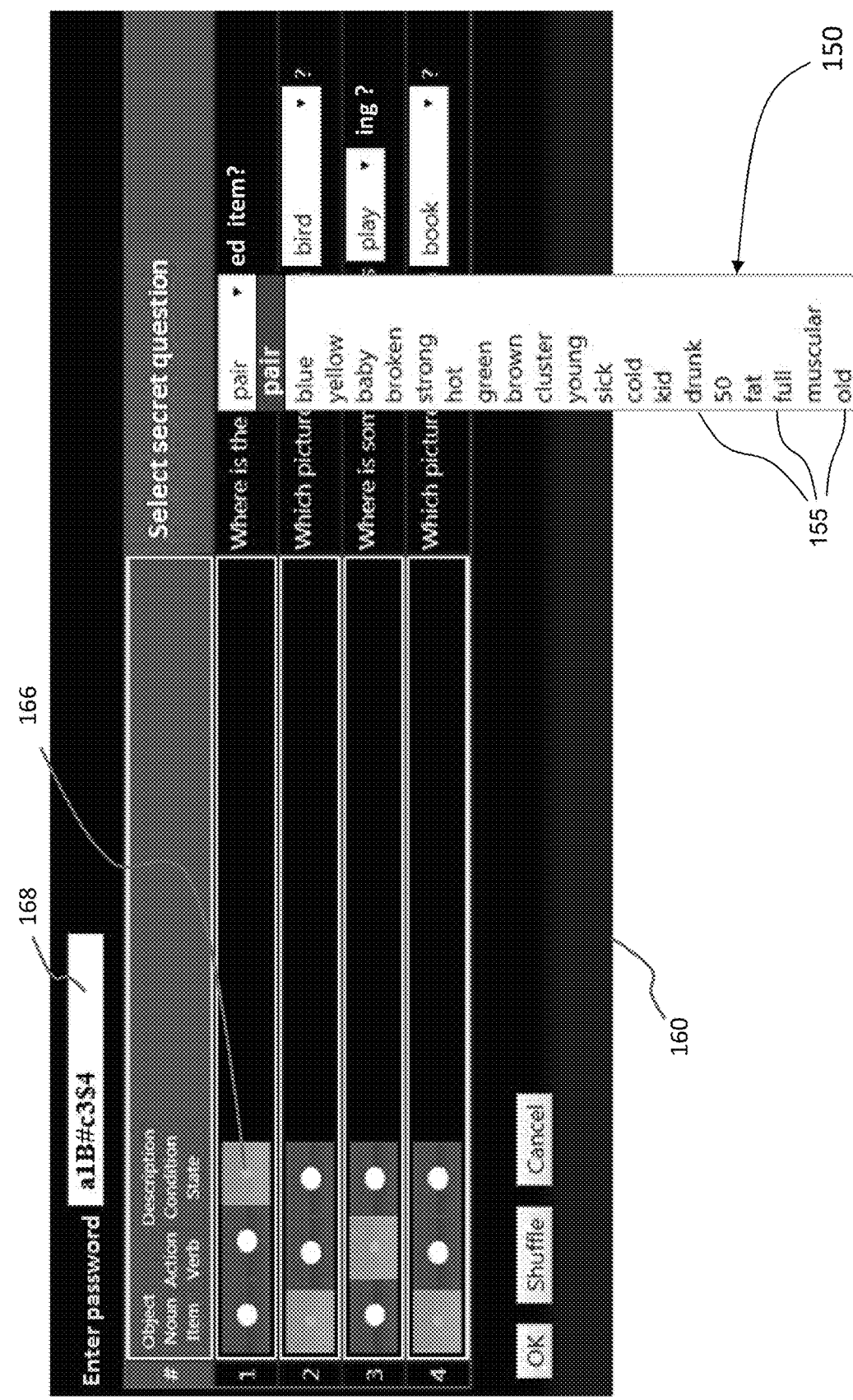
FIGS. 4f-4i demonstrate sample embodiment usage scenario, for configuring textual password with an ordered list of 4 secret-questions, wherein optional secret-questions from optional secret-questions categories are provided to the user for selection, and optional secret-keywords are presented to the user for selection, after a secret-question was selected.
Figure 4G:
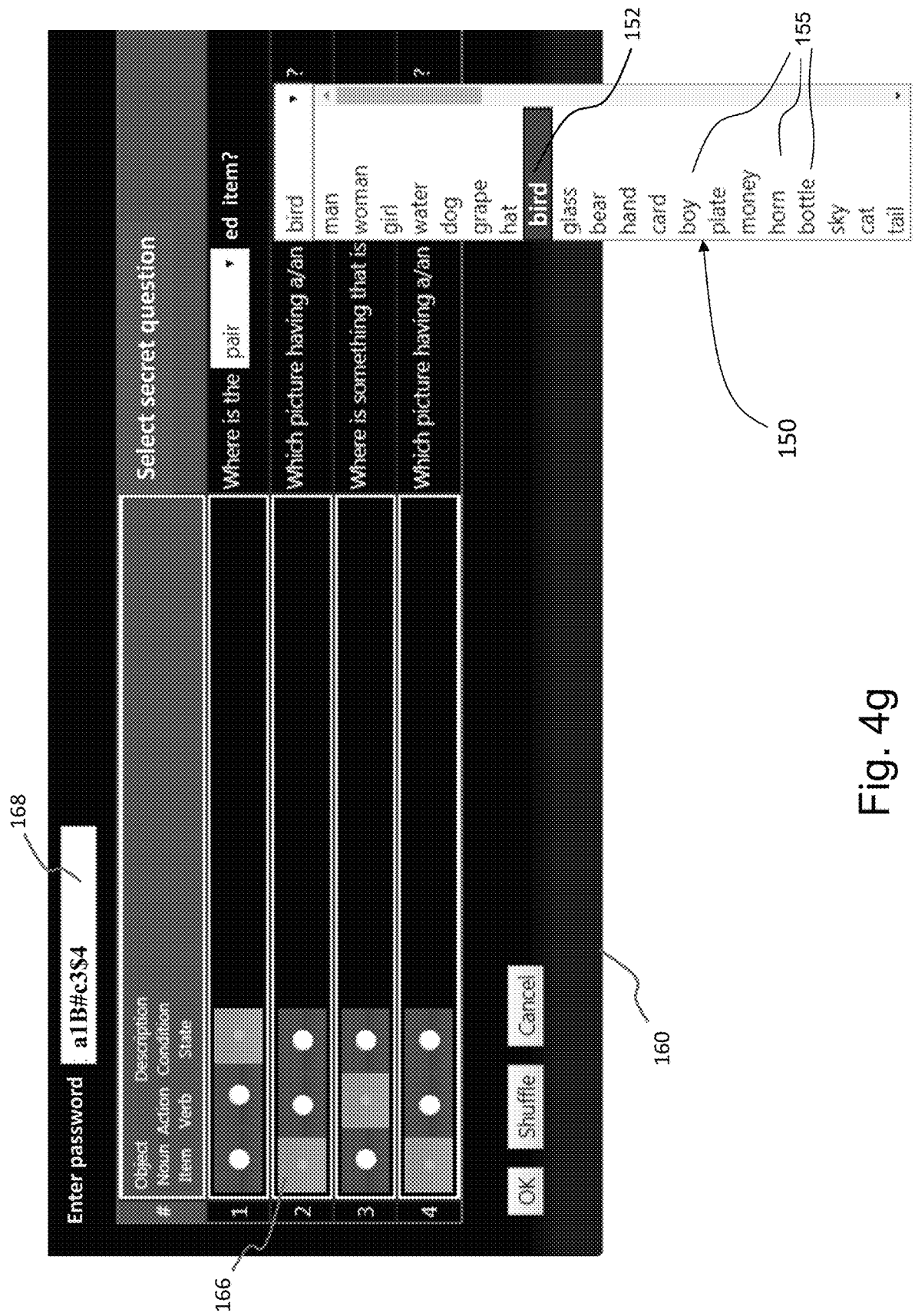
Figure 4H:
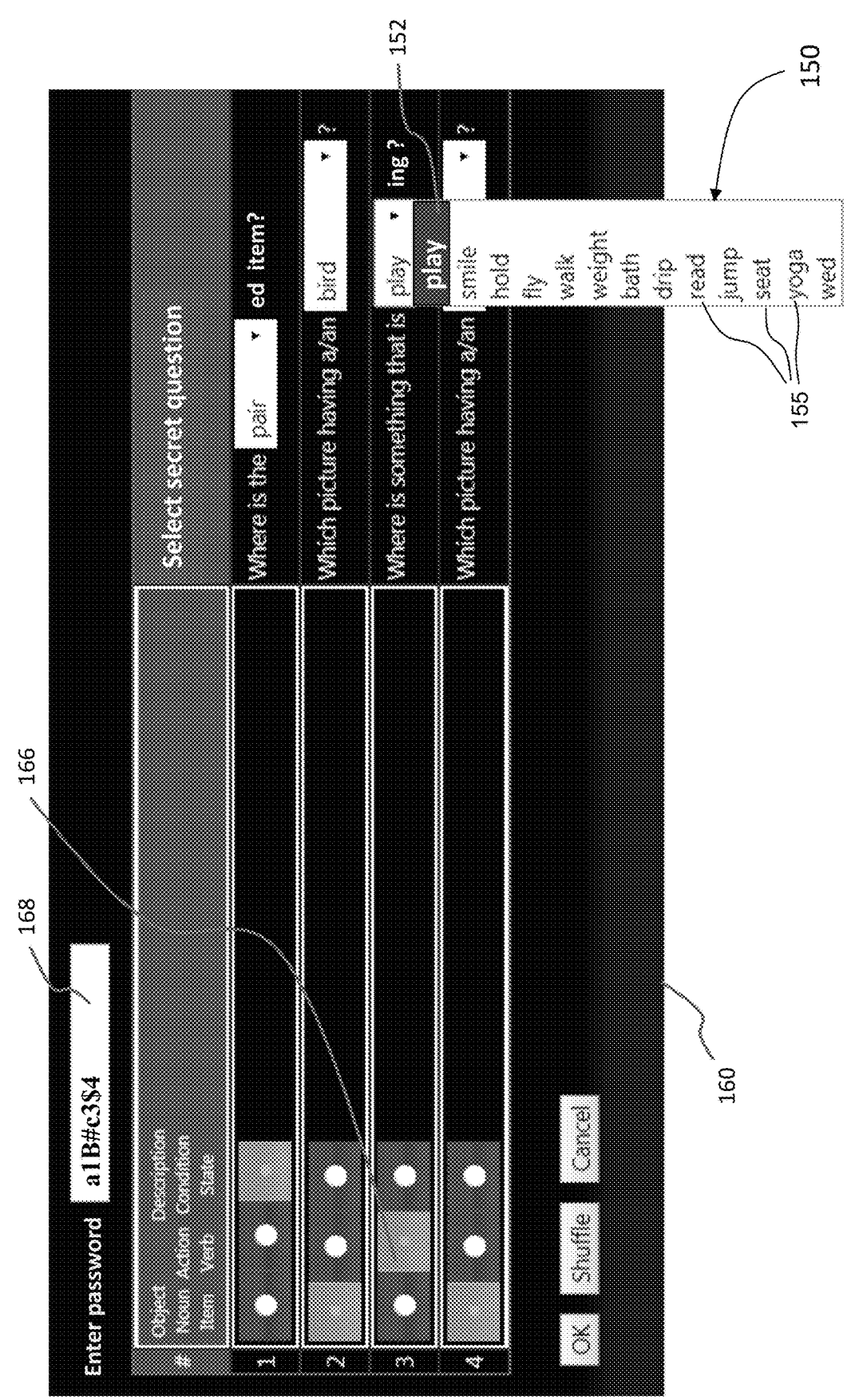
Figure 4I:
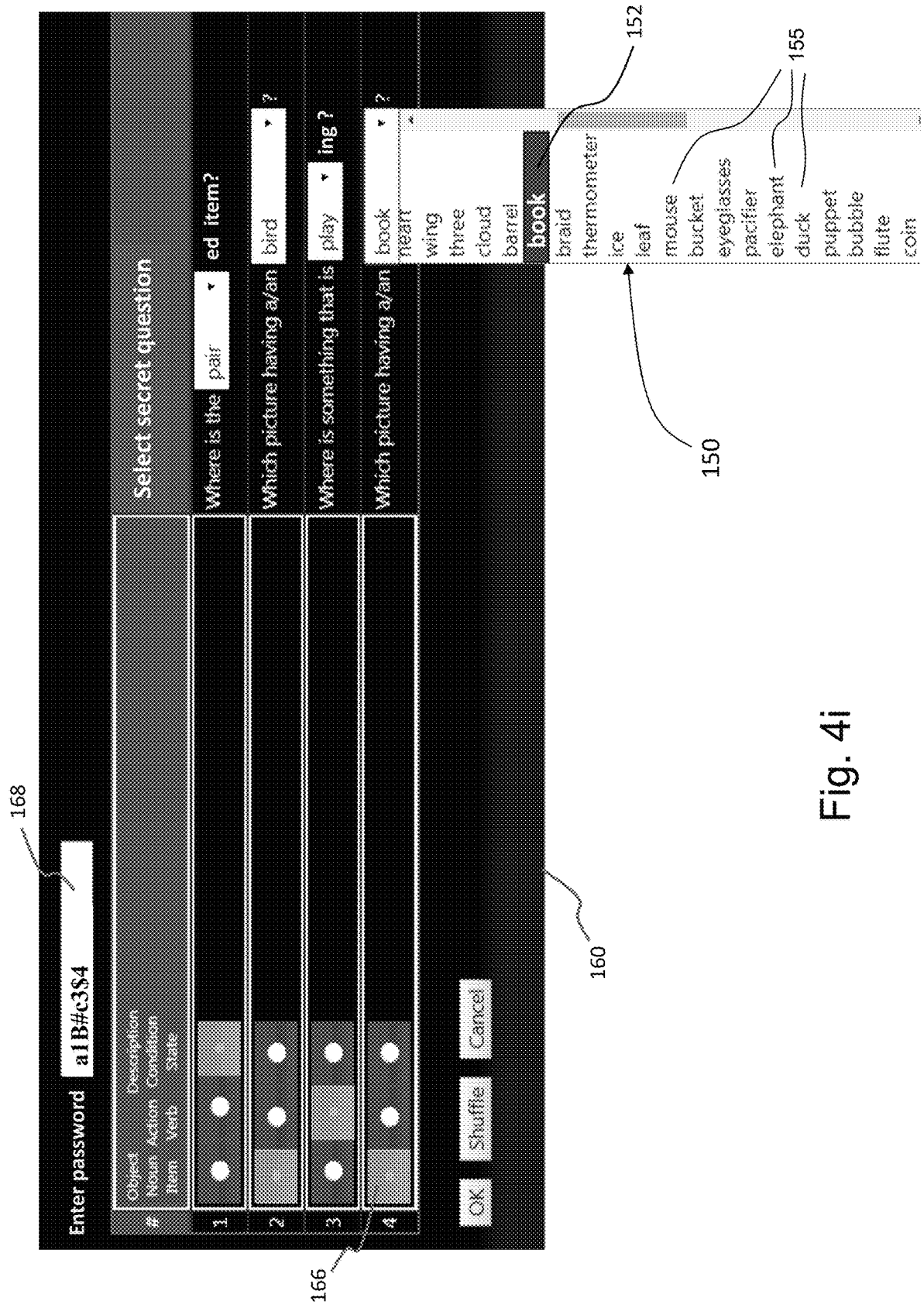

According to some aspects of the present disclosure, at least one selected secret-keyword 152 is associated with a respective selected secret-question 142 (see FIG. 4*a*). As such, the user needs to remember the secret-questions 142.

Figure 3C:
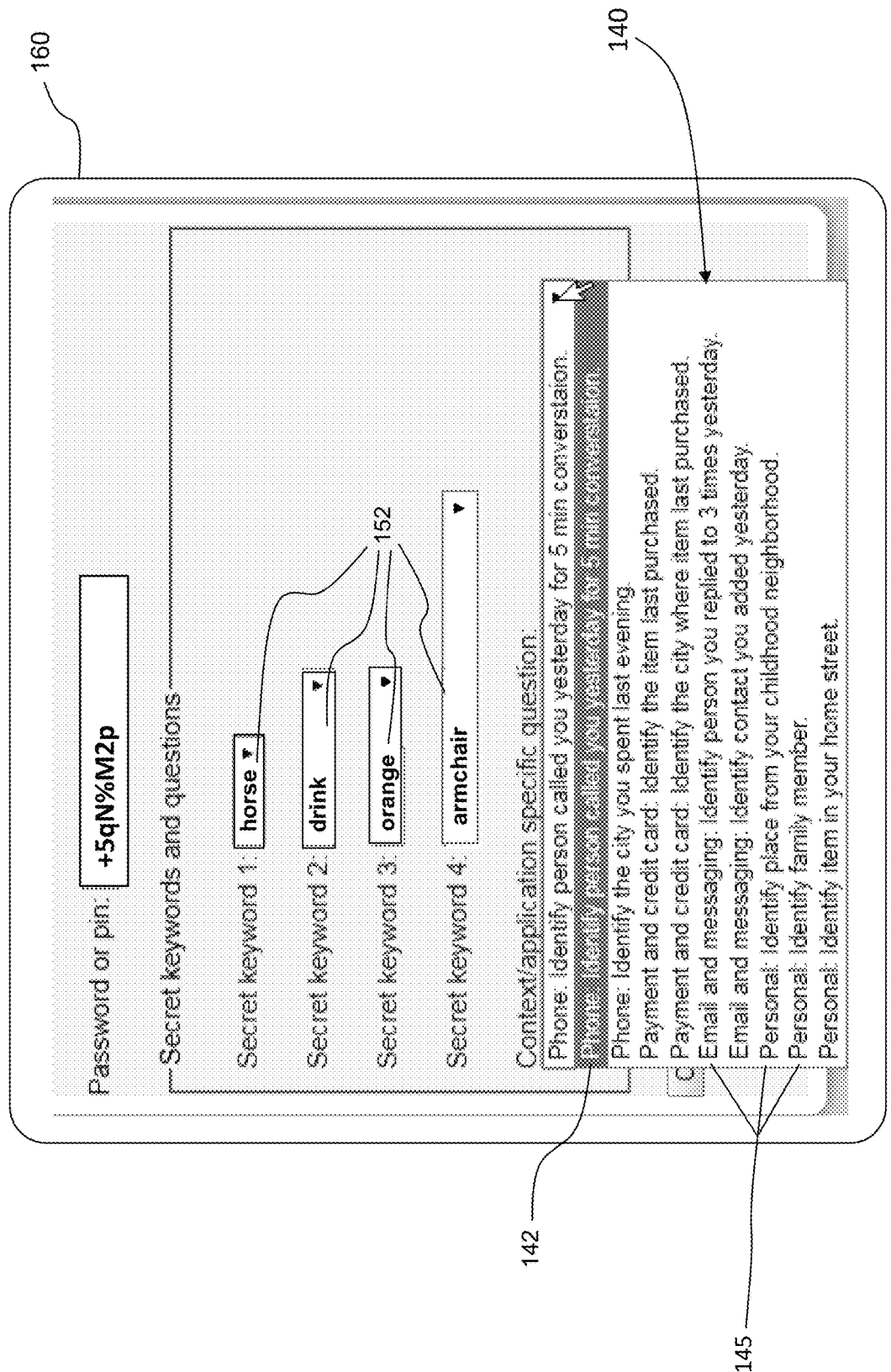

Optionally, with reference to FIGS. 3*b* and 3*c*, as well as to FIG. 4*a*, each of the N selected secret-keywords 152 can be replaced by a selected conceptual secret-question 142 from a list 140 (see FIG. 3*c*) of candidate conceptual secret-questions 145. Accordingly, in the password configuration stage, the user is presented, for example, in the form of runtime-environment interface 160, with a plurality 140 of candidate questions 145 stored in a candidate questions storage 126 in an addressable location of data repository 120. Thereby, an ordered list of N selected conceptual secret-questions 142 and/or selected secret-keywords 152 is selected by the user. Hence the user may associate any of the selected secret-questions 142 with a password segment, wherein the answer to a selected secret-question 142 is converted (preferably in runtime) to a respective secret-keyword 152 in the ordered secret list of N selected conceptual secret-questions 142.

In the example password configuration form 160 shown in FIG. 4*a*, there are 4 questions (N=4). The example questions are static and allow secret-keyword selection at configuration time. It should be noted that the secret-questions facilitate dynamic setting of secret-keywords at runtime.

The response to a conceptual secret-question is selected from the group of concepts, the group including objects, states of an object, creatures, events, verbs, locations, monuments, adjectives, adverbs, time, characters, symbols, graphics and combinations thereof. FIGS. 4*f*-4*i* depict examples where the category 166 of the secret-questions can be selected, in the password configuration stage 202.

Step 230: segmenting the password space into N textual space segments.

The user may segment the chosen textual password into N vacant-password-placeholders 164. Each vacant-password-placeholder 164 is designed to be filled with a textual-segment from the ordered sequence of M symbols/characters as provided in step 210.

It should be noted that each vacant-password-placeholder 164 may be filled/assigned with respective a password-textual-segment either in the configuration stage (by the user) or at the runtime stage (automatically, by the password-entry system 100).

The first encryption layer is accomplished.

It should be noted that order of steps 230 and 220 are interchangeable, that is step 230 may take place before step 220.

It should be further noted that each symbol of a chosen textual password must participate and be represented only once. A NULL segment is allowed. The segments can be of any length S that is less or equal to the ordered sequence of M symbols, i.e., S M.

Step 240: associating each segment with the respective secret-keyword in the same order.

Password-entry system 100 respectively associates the ordered list of N password space segments (placeholders 164) with the ordered list of N secret-keywords, thus forming the ordered list of secret-keywords.

The second encryption layer is accomplished.

Step 250: providing a multiplicity of pictures stored in an addressable location of the data repository, wherein each picture is associated with at least one candidate keyword 155.

Password-entry system 100 associates each candidate picture 305 stored in a candidate pictures storage 124 in an addressable location of data repository 120 with at least one candidate keyword stored in storage 122 in addressable location in data repository 120.

This association provides a third encryption layer.

It should be noted that the association of the conceptual secret-questions 145 with the respective secret-keywords 155 provides an intermediate encryption layer between password-segments and secret-keywords layers.

It should be noted that that candidate pictures 305 stored in candidate pictures storage 124, in an addressable location of data repository 120 repository, is dynamic. Therefore, the collection of pictures assigned per a secret-keyword may change over time. Pictures may also retire from the candidate pictures storage 124 and pictures may be added to the candidate pictures storage 124 at any time.

Step 260: optionally, the password entry system offers a hint phrase containing the ordered list of secret-keywords and/or secret-questions.

Optionally, password entry system 100 offers a hint phrase containing the ordered list of selected secret-keywords 152 and/or selected secret-questions 142. The user may modify the hint phrase provided by password entry system 100, to help remembering the ordered list of selected secret-keywords 152 and/or selected secret-questions 142.

Examples

In a first example (as shown, with no limitations, in FIGS. 3*a*-3*c*), the following textual password is selected by the user (or a secured runtime-environment 130): +5qN % M2p. The user (or the password-entry system at the runtime stage) has chosen, by way of example, to segment the password into an ordered list of 4 (N=4) password-textual-segments {"+5q", "N", "% M", "2p"}. Then, the user selects an ordered list of secret-keywords {152$_a$, 152$_b$, 152$_c$, 152$_d$} from a plurality of candidate keywords 155 in the candidate keywords-repository 122, in an addressable location of data repository 120. Each password-textual-segment is then associated with a respective selected secret-keyword 152 as follows: {"horse"→"5q", "drink"→"N", "orange"→"% M" and "armchair"→"2p"}.

In a second example (as shown, with no limitations, in FIG. 4*a* in the form of a runtime-environment interface 160), the following textual password is selected by the user (or a secured runtime-environment 130): a1B#c3$4. In the preliminary password configuration stage, the user (or the password-entry system at the runtime stage) can choose to segment the password into an ordered list of 4 (N=4)

vacant-password-placeholders 164 {"space$_1$", "space$_2$", "space$_3$", "space$_4$"}. Then, the user selects an ordered list of secret-keywords 152 {"pair", "bird", "play", "book"} from a plurality of candidate keywords 155 in the candidate keywords-repository 122, in an addressable location of data repository 120. Each vacant-password-placeholder 164 is then associated with a respective selected secret-keyword 152 as follows: {"pair"→"space$_1$", "bird"→"space$_2$", "play"→"space$_3$" and "book"→"space$_4$"}.

The vacant-password-placeholders 164 {"space$_1$", "space$_2$", "space$_3$", "space$_4$"} can be orderly associated with segments of the textual password, in either the password configuration stage 202, or the runtime password entry stage 204.

The user can further select (in step 260) a hint phrase, such as: "A pair of birds are playing in the jungle-book movie", containing the ordered list of N (bolded) secret-keywords, to help him/her memorize the ordered list of secret-keywords.

Figure 5A:
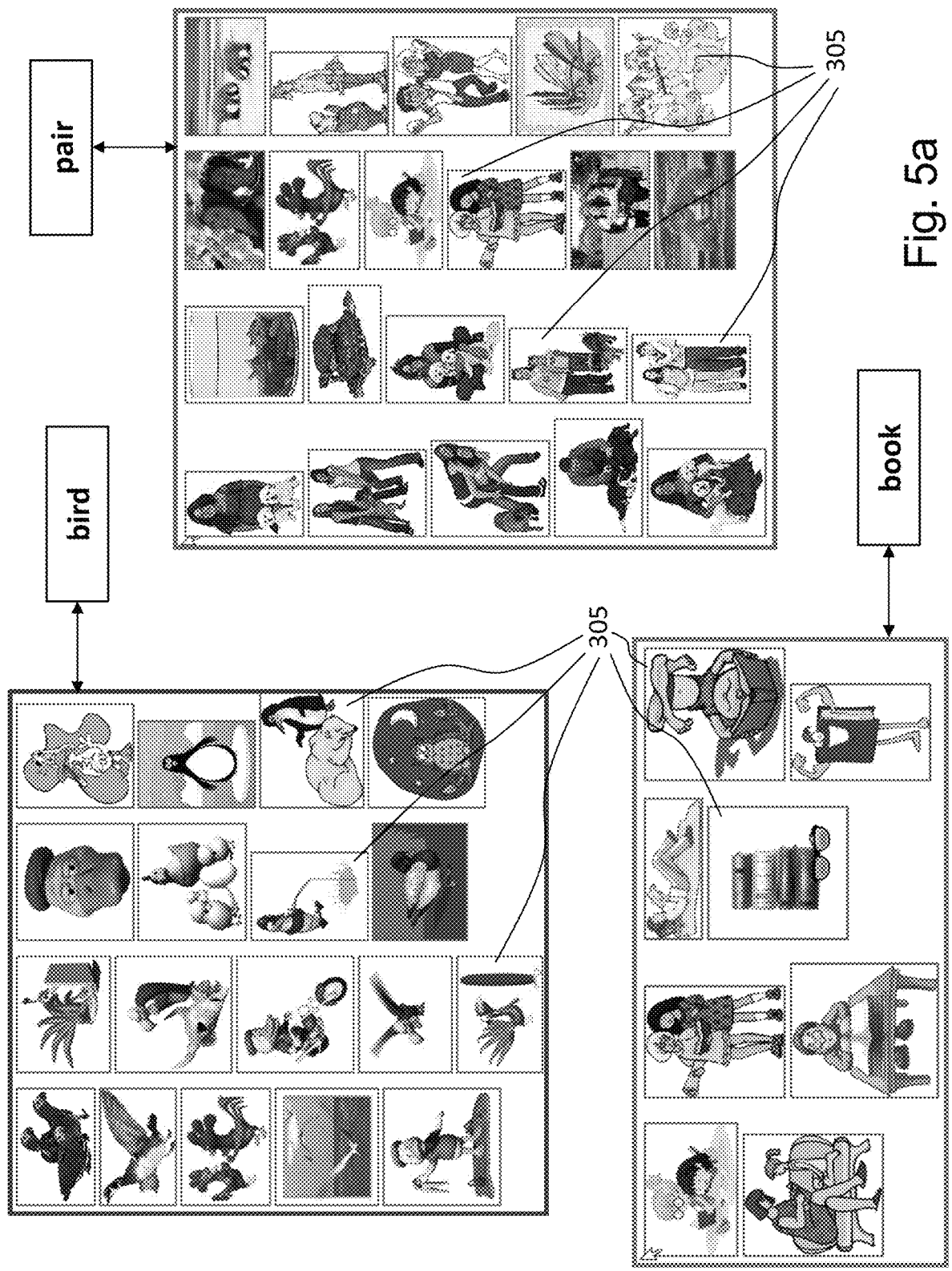
FIGS. 5a and 5b show example of 4 batches of pictures, wherein each picture in a batch is associated with a common secret-keyword of that batch.
Figure 5B:
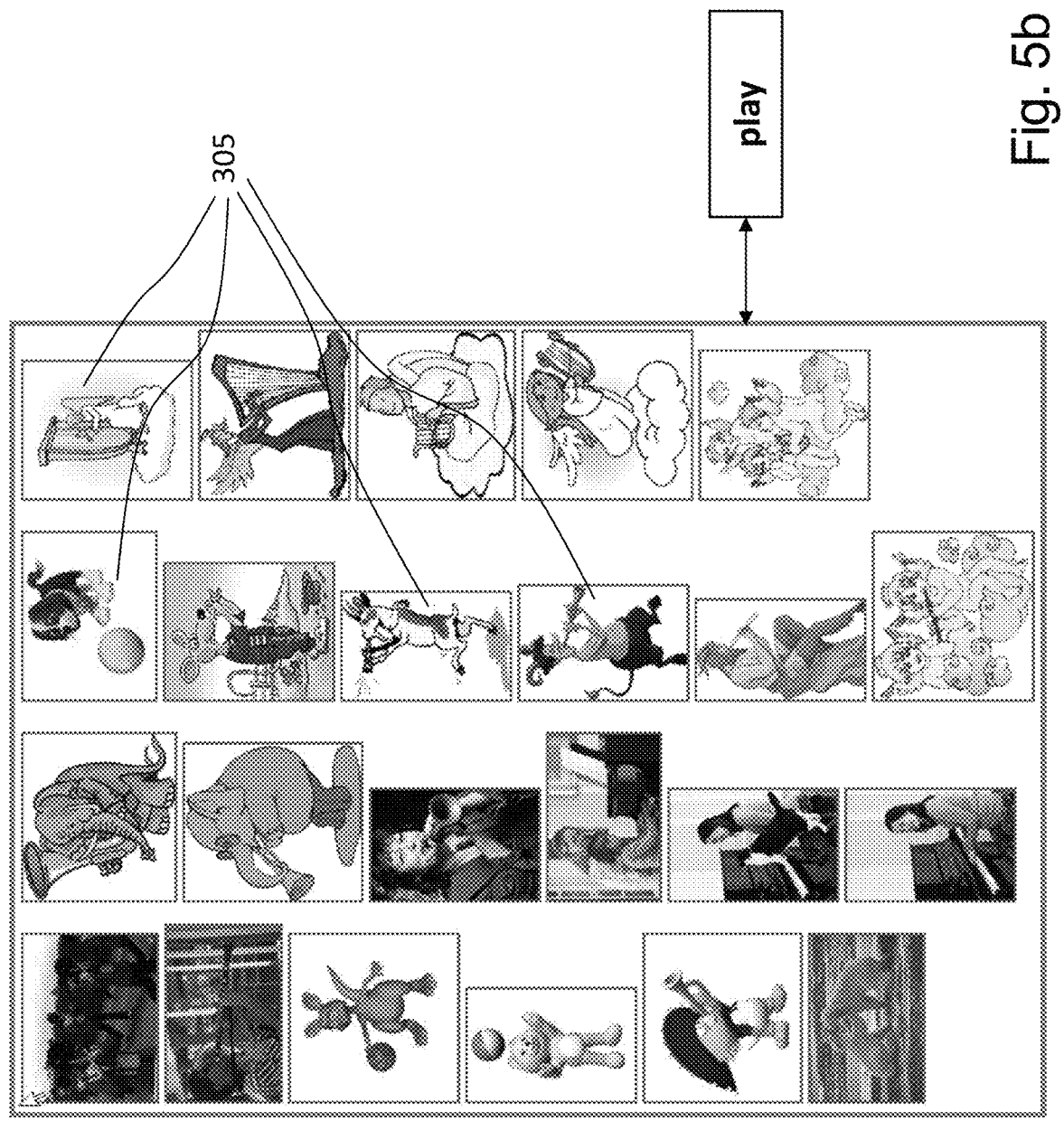

It should be noted that each candidate keyword 155 in the candidate keywords-repository 122 is associated with a plurality of pictures 305, as exemplified in the respective groups of pictures depicted in FIGS. 5a and 5b. In the examples shown, the "pair" is shown to be associated with a plurality of pictures 305; the "bird" is shown to be associated with a plurality of pictures 305; the "play" is shown to be associated with a plurality of pictures 305; and the "book" is shown to be associated with a plurality of pictures 305.

The runtime-environment interface 160 that is shown in FIG. 4a also exemplifies means for assigning secret-questions and secret-keywords to a password, at configuration time. It should be noted that secret-keywords may be determined also at runtime. It should be noted that the secret-questions assist in memorizing the ordered list of secret-keywords, wherein the response to a question is in fact a respective secret-keyword. The questions also facilitate dynamic setting of secret-keywords at runtime. The response to each such secret-question is provided by selecting the appropriate picture 305, which (when the correct picture 305 is selected) is expected to be associated with the sought secret-keyword.

It should be appreciated that the conceptual secret-question may take a variety of forms, for example, with no limitations:

Which picture is related to India?
  The selected picture 302 (see FIG. 6a) should hint the user that "India" is the sought secret-keyword 152, and therefore selected. Pictures may include ethnic sites, people, mythological characters, dishes, art etc., known to be associated with India.

What is the date of birth of your youngest child?
  The selected picture 302 may contain a year number, or an event that happened in that year, a newspaper from that year, a movie from that year, etc.

What picture is taken inside an aircraft?
  The selected picture 302 may show a picture of an aircraft interior such as the cabin, or aircraft passengers en route, or an aircraft cockpit, or workers inside an aircraft, etc.

Where is a picture from your childhood neighborhood?
  The selected picture 302 should hint the user the location of their childhood neighborhood, past pictures or current pictures from community known places such as school, church, grocery store, parks, etc.

Where is my car parked?
  The selected picture 302 should hint to the location of the current parking site of the user's car (assuming it is parking). Pictures could contain street name, street images, parking place, institutions in proximity etc.

This question requires run time computation, of the current car location using Internet-Of-Things (IOT) module 128, and computing the correct keywords for the car geographical location, and computing or selecting the correct pictures 305 for the car geographical location.
(End of password configuration example 2).

It should be appreciated that a picture 305 or a secret-keyword 152 may be associated with a plurality of secret-questions 142. It should be further appreciated that a picture 305 or a secret-keyword 152 may be associated with a secret-question 142 regardless of the object(s) depicted in the particular picture 305. It should be further appreciated that a picture 305 may be associated with a secret-question 142 regardless of the secret-keywords 152 associated with that particular picture 305.

It should be noted that a picture 305 may be associated with a secret-question 142 within a time context, and wherein the time context is selected from a group of time periods including a fraction of an hour, an hour, a day, a number of days, a week, a number of weeks, a month, a number of months, a year, a lifecycle stage, a season, an era, a number of years, and a combination of the periods.

It should be further noted that the response to a candidate conceptual secret-question 142 can be determined in real time, for example, by an using IOT module 128 (see FIG. 1c). In some aspects of the present disclosure, the IOT module is an IOT interface that operatively interfaces password-entry system 100 with a remote IOT sub-system. In other aspects of the present disclosure, the IOT module is an IOT sub-system integrated into password-entry system 100.

It should be further appreciated that the password entry method 200 can be used for a partial password entry. The password entry system 100 can be used to respectively enter a portion of the textual password into at least one pre-determined vacant-password-placeholder 164, wherein at least one pre-determined vacant-password-placeholder 164 is determined in the runtime stage. For example, password entry system 100 can be used to insert only the tricky or changeable part of the password (last 4 characters, or Unicode/emoticons, etc.), in combination with a keyboard or as a "Captcha". For example, if that the tricky part of the password is the first 4 letters. However, after a few days the tricky part of the password is from the $3^{rd}$ character to the $8^{th}$ character. Hence, the user may configure which part of the password to be inserted at run time as well.

It should be further appreciated that the preliminary password configuration stage may further include at least one method of memorizing a hint phrase representing said ordered list of secret-keywords or list of secret-questions.

It should be further appreciated that the received textual-password can be received in the runtime stage from the secured runtime-environment 130, and may be received in a form hidden from the user.

The following is a typical scenario for user experience with password entry system 100 in response to a runtime authentication request, assuming the corresponding password configuration stage 202 is completed. According to aspects of the present disclosure, in the runtime stage, before presenting the pictures group layouts 300 to the user, password-entry system 100 segments the textual password expected from the user, into N password-textual-segments, wherein each of the N ordered password-textual-segments are respectively placed/filled, by password-entry system 100, in the ordered list of N vacant-password-placeholders 164, such that each password vacant-password-placeholders 164 is then filled with a respective password-textual-segments and is associated with sought secret-keyword 152 as in the following example (see FIG. 4a):
{"pair"→"a1", "bird"→"B#c", "play"→"3$" and "book"→"4"}.

Password-entry system 100 then presents the user with groups of K pictures (see examples in FIGS. 6a-6d, where K=12), where each picture 305 is associated with at least one pre-selected keyword, wherein, typically, only Q pictures of each presented group (layout) 300 of K pictures 305 represents the currently sought secret-keyword 152 in the ordered list of secret-keywords, and wherein K>>Q, N≥Q and Q>0.

In the above second example, in the runtime password entry stage 204, password-entry system 100 presents the user with the first group of pictures 300 (see FIG. 6a), via the GUI. The user is expected to select from the first group of pictures 300 the sought picture in FIG. 6a, picture $302_a$. Picture $302_a$ answers the secret-question (142) #1 in FIG. 4a, "where is the paired item?", which secret-question 142 (is answered via the pair of puppies $302_a$) is associated with secret-keyword 152 "pair", and secret-keyword (152) "pair" is associated with password-textual-segment "a1". Password-entry system 100 then inserts password-textual-segment "a1" into the text input means 168, that is provided by the authenticator via the secured runtime-environment 130. It should be appreciated that the keyword 155 "pair-ed" belongs to the items type 166 description, state or condition, as presented in the alternative password configuration depicted in FIG. 4f.

Figure 6B:
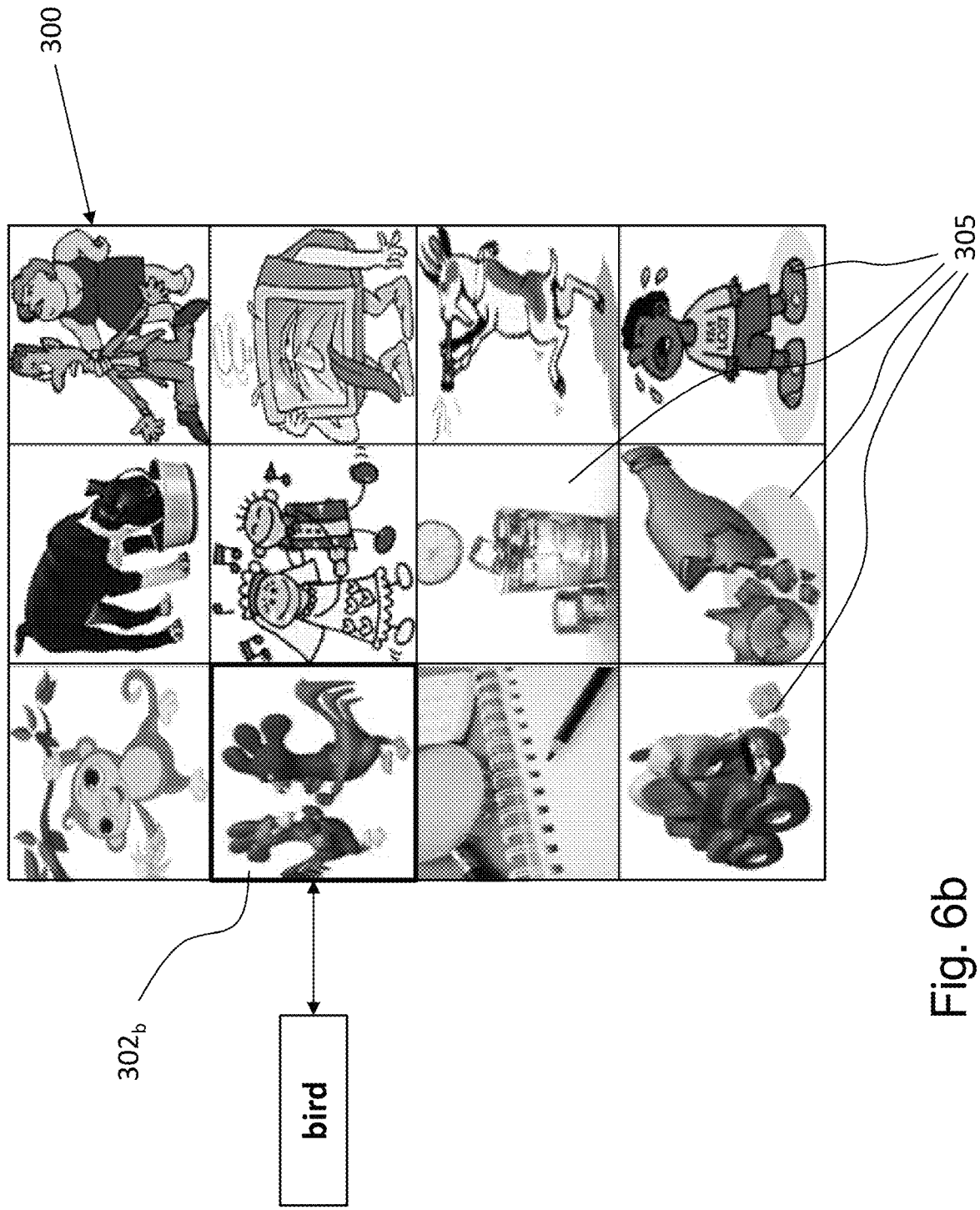

Next, password-entry system 100 presents the user with the second group of pictures 300 (see FIG. 6b). The user is expected to select from the second group of pictures 300 the sought picture $302_b$. Picture $302_b$ answers the secret-question (142) #2 in FIG. 4a: "which picture has a bird?", which secret-question 142 is associated with secret-keyword 152 "bird", and secret-keyword (152) "bird" is associated with password-textual-segment "B#c". Password-entry system 100 then concatenates password-textual-segment "B#c" to the already inserted textual segment ("a1") in text input means 168. It should be appreciated that the keyword 155 "bird" belongs to the items type 166 noun or object, as presented in alternative password configuration embodiment FIG. 4g.

Figure 6C:
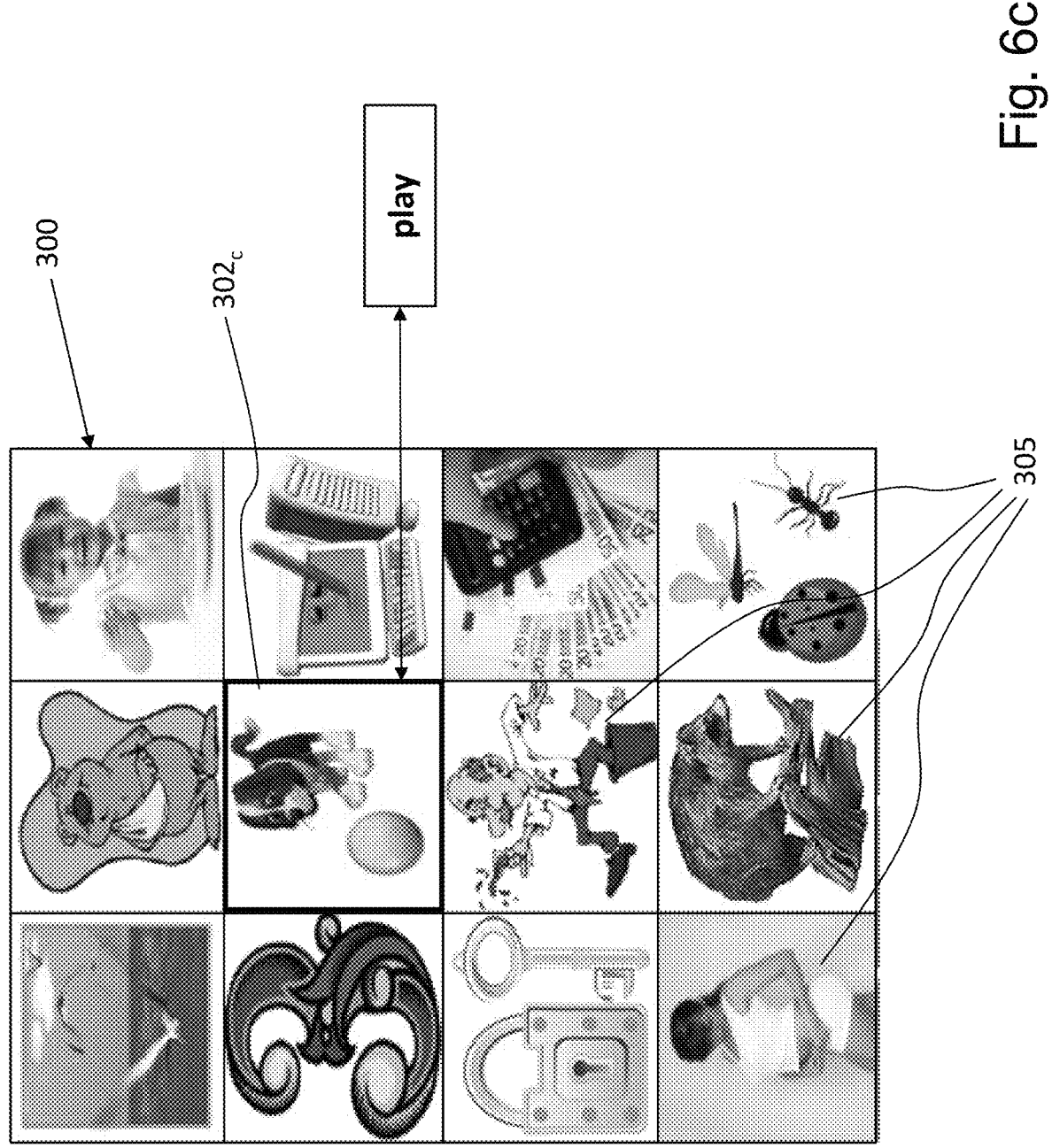

Next, password-entry system 100 presents the user with the third group of pictures 300 (see FIG. 6c). The user is expected to select from the third group of pictures 300 the sought picture 302. Picture 302 answers the secret-question (142) #3 in FIG. 4a: "where is something that is playing?", which secret-question 142 is associated with secret-keyword 152 "play", and secret-keyword (152) "play" is associated with password-textual-segment "3$". Password-entry system 100 then concatenates password-textual-segment "3$" to the already inserted textual segment(s) in text input means 168. It should be appreciated that the keyword 155 "playing" belongs to the type 166 describing an action verb, as presented in alternative password configuration embodiment FIG. 4h.

Figure 6D:
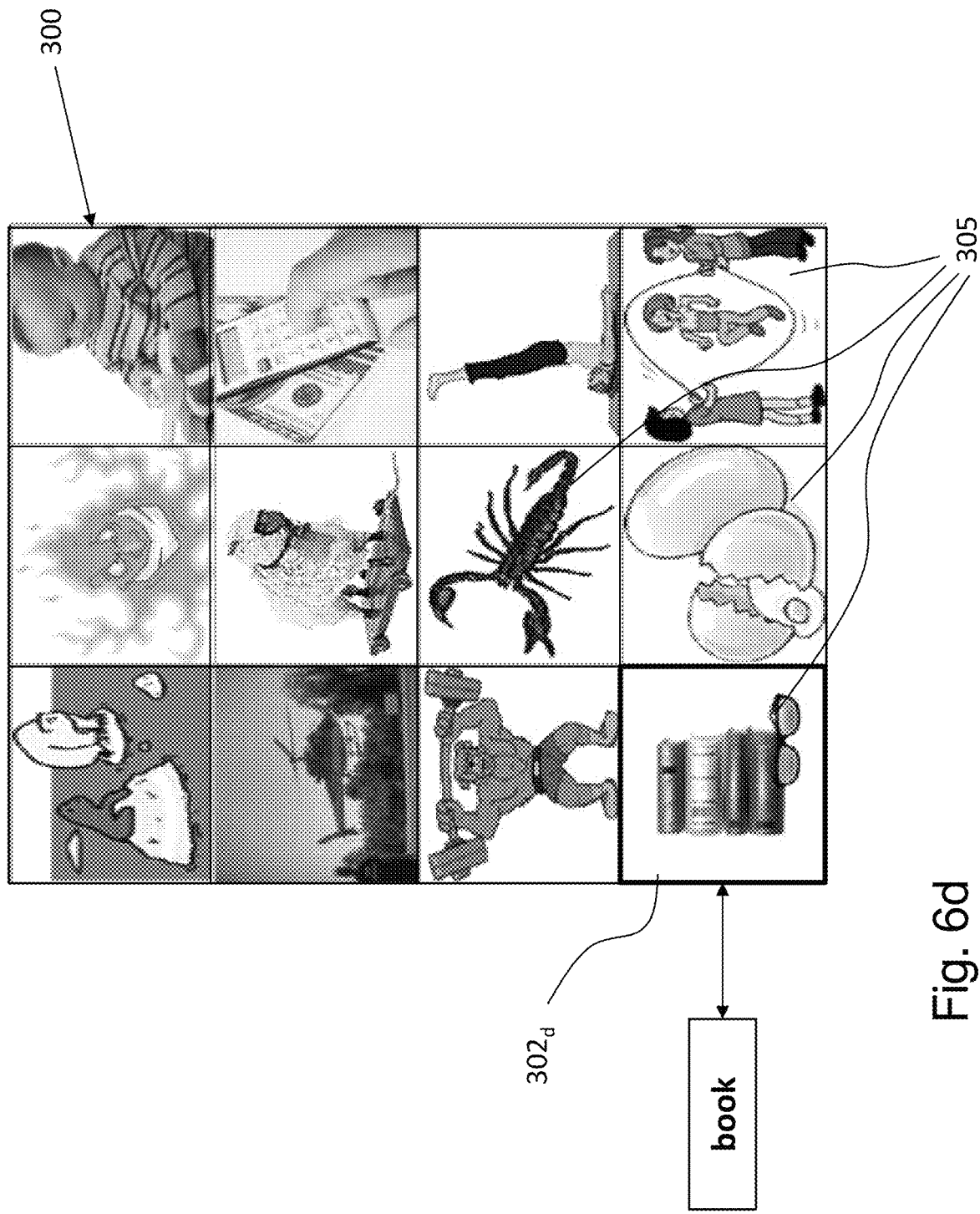

Next, password-entry system 100 presents the user with the fourth group of pictures 300 (see FIG. 6d). The user is expected to select from the fourth group of pictures 300 the sought picture $302_d$. Picture $302_d$ answers the secret-question (142) #4 in FIG. 4a: "which picture has a book?", picture $302_d$ which secret-question (142) is associated with secret-keyword 152 "book", and secret-keyword "book" is associated with password-textual-segment "4". Password-entry system 100 then concatenates password-textual-segment "4" to the already inserted textual segment(s) in text input means 168. It should be appreciated that the keyword 155 "book" belongs to the item type 166 object/noun item, as presented in alternative password configuration embodiment FIG. 4i.

In yet another example, the example relates to the secret-question: 'what is my favorite movie character', wherein the answer is: 'Charlie Chaplin'. Hence, the secret-keyword is also 'Charlie Chaplin'. The corresponding layout may contain many pictures, but only one picture in the presented layout group of pictures can be associated to 'Charlie Chaplin' as a character in a movie or advertisement, or drawings, or an event not showing the character just the name in a street name or book cover, and so on.

The answer to secret-question, which is 'Charlie Chaplin', is known at configuration time. Therefore, there is no need for runtime computation. Hence, the logical order for constructing password-segment is as follows:

1. Retrieve the secret-keyword: 'Charlie Chaplin' from the candidate keywords-repository 122.
2. Select a single picture that is associated with the secret-keyword 'Charlie Chaplin' to be included in the pictures group layout. No other picture in the current pictures group layout can be associated with the secret-keyword 'Charlie Chaplin'.
3. Wait for the user to select the picture that is associated with the secret-keyword 'Charlie Chaplin'. Once the correct picture is selected, the selected picture that is associated with secret-keyword is matched, and therefore the correct password segment is also matched. The correct password segment is then entered to input device.

In yet another example, an example related to a secret-question in which the answer to the secret-question being the secret-keyword is computed at runtime. The logical order for constructing password-segment is as follows:

1. The secret-question is: 'what was my last 100$ or more purchase with credit card?
2. The answer requires runtime computation. At runtime, the password-entry system 100 communicates with the appropriate credit card data center (employing IOT module 128), to thereby finds out that the latest purchase is a pair of new car tires. Hence, a new set of pictures is required because there are no pictures with car tires in the candidate pictures storage 124. Each newly retrieved picture (retrieved from an alternative resource employing IOT module 128) needs to be tagged with keywords at run time automatically. Hence, at runtime, the password-entry system 100 performs the following steps:
    a. Assign and store a new secret-keyword: 'Car tire'.
    b. Associate at least one picture with the new secret-keyword: 'Car tire', wherein the picture with distinguished car tires. For example, a Formula 1 tire changing that may exist in candidate pictures storage 124.
    c. Create a pictures group layout, including the Formula 1 tire changing picture.
    d. Wait for the user to select the picture that is associated with the secret-keyword 'Car tire'. Once the correct picture is selected, the selected picture is matched to verify that it is associated with the secret-keyword, and therefore also the correctness of the password segment is verified. The correct password segment is then entered to input device.

Figure 7:
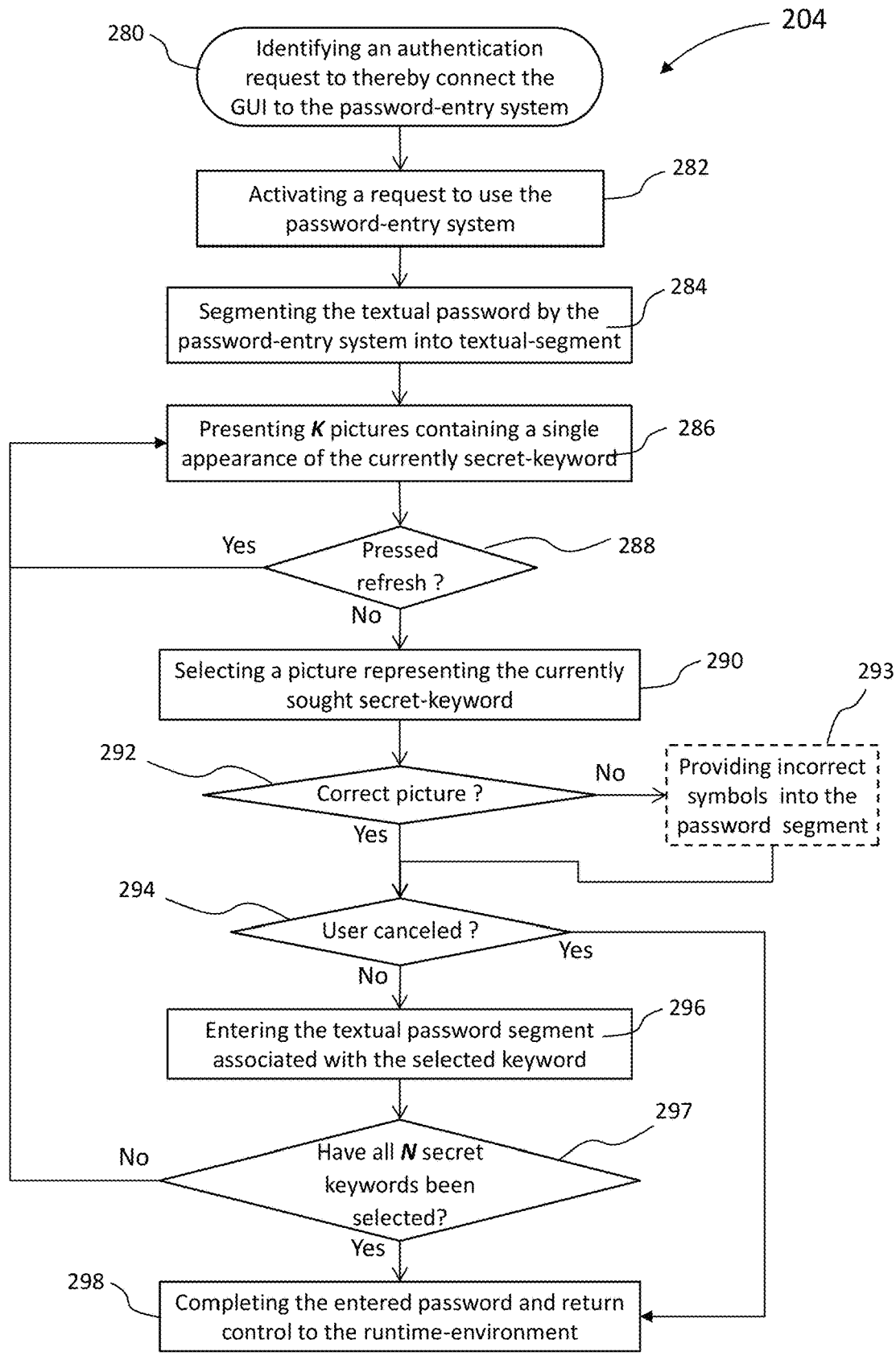
FIG. 7 is a flow diagram illustration of the runtime stage of the password-entry method, according to aspects of the present disclosure.

Assuming the corresponding password has been configured correctly at password configuration stage 202, upon being prompt to provide the textual password to a respective authenticator, the password-entry method 200 proceeds with the runtime password entry stage 204, as illustrated in the flow diagram of FIG. 7, where the password-entry interface module 132 identifies, in step 280, the active embodiment as an authentication request, and notifies password-entry system 100. Typically, the secured runtime-environment 130 provides for the user to enter a preset textual password, wherein a non-limiting example of a text input means 168 is depicted in FIG. 2a. The runtime stage 204 proceeds with the following steps:

Step 282: activating a request to activate the password-entry system, by the user.

The user activates a request to activate password-entry system 100. For example, the user can double click (169) on the text input means 168 or, in another alternative, do a long press on the text input means 168, as exemplified in FIG. 2b.

An active user identifier (for example an email account) is retrieved from password-entry interface module 132 or from authentication module 134 (for example current login user account for authenticator request).

The password-entry system 100 retrieves the configured password from an addressable memory location in data repository 120, for the identified user, with the list of N selected secret-keywords 152 or selected secret-questions 142. Optionally, if password-entry system 100 is integrated to operate with authentication module 134, the current password for the identified user can be retrieved at run time from the authentication module 134.

Additionally, for any secret-question 142 that require dynamic run-time answers, the corresponding answer is computed using the TOT module 128 and the data repository 120. Upon completion of the list of N secret-keywords, password entry system 100 has all the required information to proceed with password entry method 200 to completion.

Step 284: segmenting the textual password by the password-entry system.

Optionally, in the runtime stage, if not done so in the configuration stage, before presenting a group of pictures 305 to the user, password-entry system 100 segments the textual password retrieved in step 282 for the identified user, into N password-textual-segments, wherein the N password-textual-segments are designated to respectively replace/fill the ordered list of N vacant-password-placeholders 164, such that each password-textual-segment will then be associated with a respective pre-configured (in step 240 or in step 282) secret-keyword 152.

Step 286: presenting K pictures to the user, representing the pre-selected secret-keywords.

Typically, for each pre-selected secret-keyword 152 in the ordered list of secret-keywords 152, a group 300 of K pictures 305 is presented to the user by password-entry system 100 (for example, from an addressable location of candidate pictures storage repository 124, via system processing module 110). The groups 300 of K pictures 305 are presented in the order of the sequential list of secret-keywords 152. Typically, in each presented group 300 of K pictures 305, only one of the pictures 305 can be paired with the correct secret-keyword 152 that is currently sought, within that group 300 of K pictures 305. The other presented pictures 305 (see example pictures 303 in FIG. 8) are associated with other keywords 155.

Figure 8:
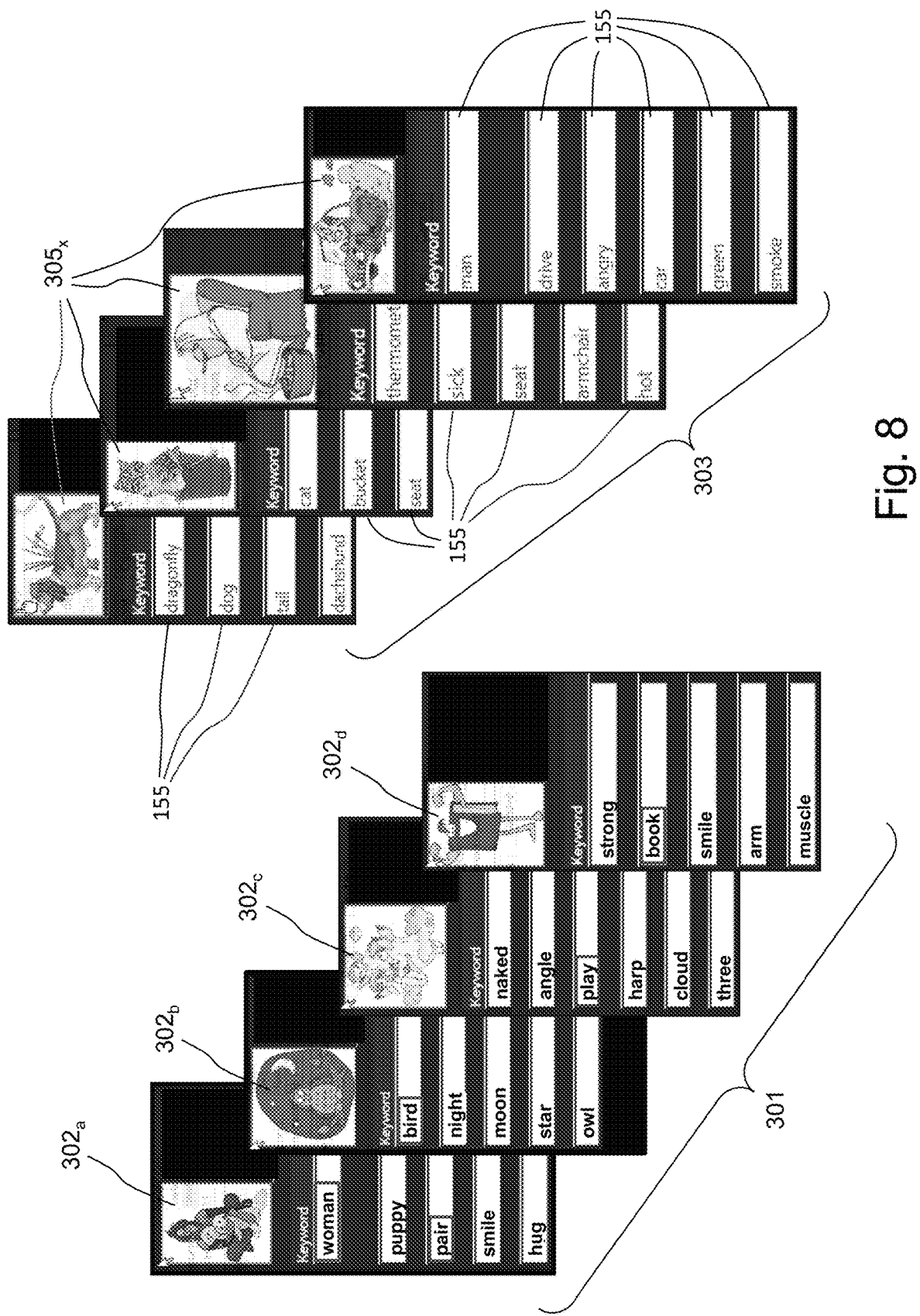
FIG. 8 depicts two partial example groups of pictures, wherein a first group depicts the N (N=4, in this example) pictures that have been selected by the password-entry system to respectively represent the ordered list of secret-keywords, and the second group depicts pictures that are associated with other optional keywords.

It should be further noted that each picture 305 that is stored, for example, in candidate pictures storage repository 124, is preconfigured to represent one or more keywords. However, typically, only one of the presented pictures 305 represents the currently sought secret-keyword 152 in each presented group 300. FIG. 8 depicts two partial example groups 301 and 303 of pictures, wherein group 301 depicts the N (N=4, in this example) pictures ($302_a$, $302_b$, $302_c$, and $302_d$) that have been selected by the password-entry system 100 to respectively represent the ordered list of secret-keywords. In this example all the candidate keywords 155 that are associated with each picture 305, are also shown, for explanation purposes only. depicts a partial group of pictures that are $305x$ that are background, noise pictures that serve to hide the sought pictures 302, that are shown, as an example only, in group 301.

Each secret-keyword 152, including the currently sought secret-keyword, is represented in the presented picture group 300 once, and only once. For example, if there are K pictures in the presented picture group 300 and a minimum of L keywords 155 are associated with each picture 305, the minimum number of keywords 155 presented to the user by the current picture group 300, is K*L keywords.

Figure 9A:
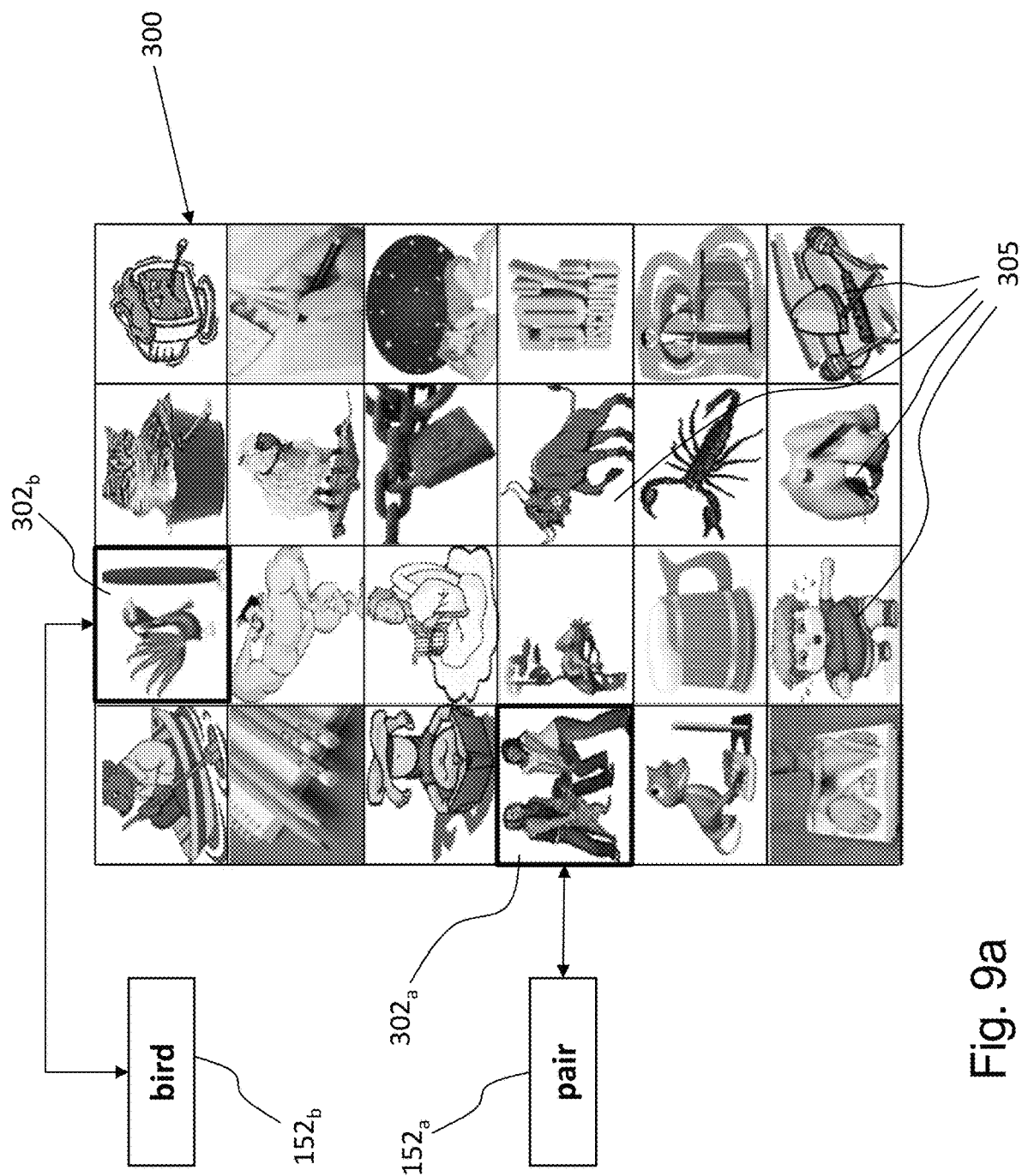
FIG. 9a-9b demonstrate sample groups of pictures for inserting a password, where each group represents 2 of the sought secret-keywords.
Figure 9B:
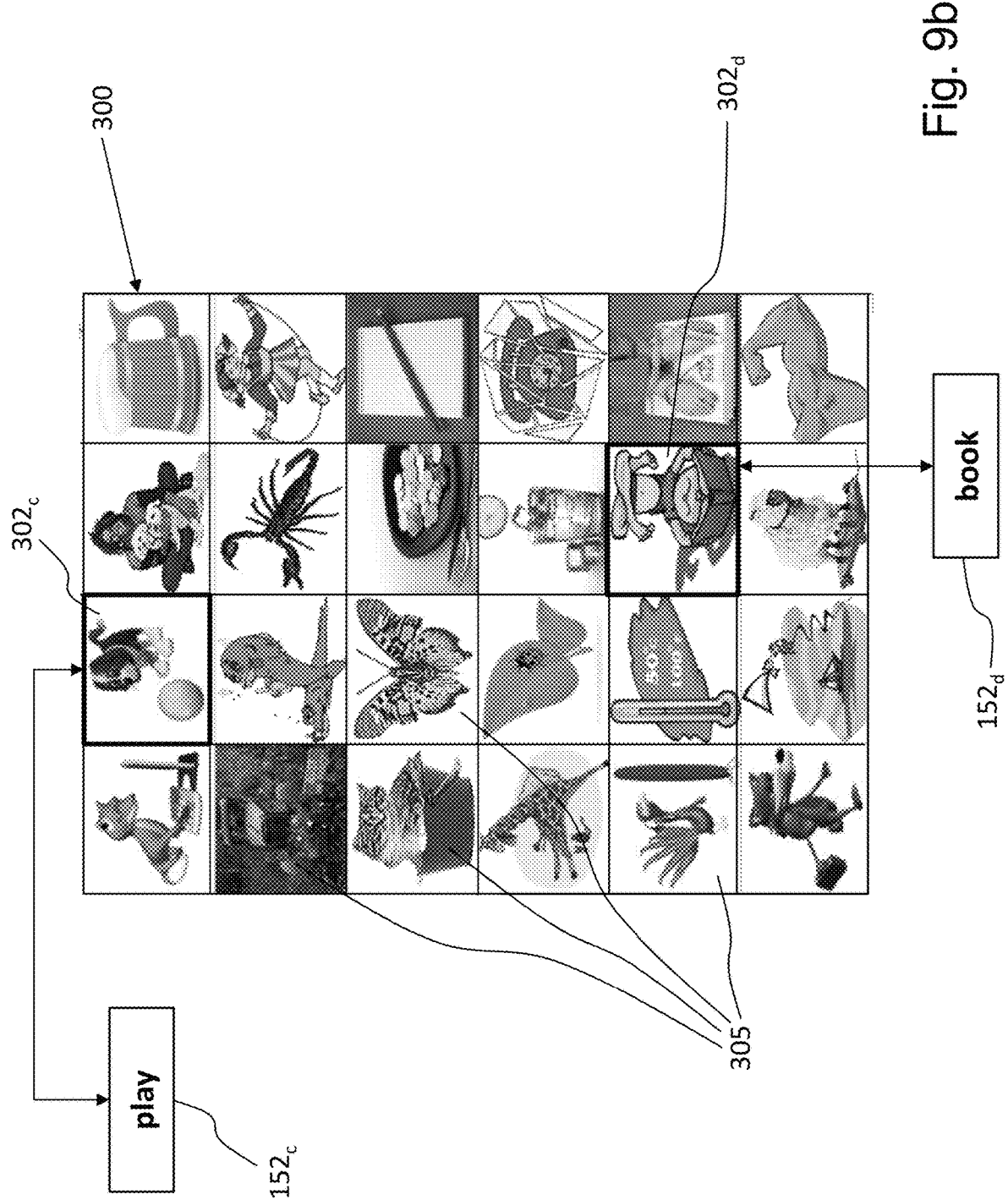

It should be noted that more than one picture 305 may be paired with secret-keyword 152 that is sought in that group 300 of pictures 305 (each secret-picture 302 with its corresponding secret-keyword 152), if the number of pictures 305 in group 300 is large, for example without limitations, K>=24 or more pictures 305. For example, FIGS. 9a and 9b depict an example embodiment according to aspects of the present disclosure. In FIG. 9a, two secret-pictures $302_a$ and $302_b$, respectively, are presented in a single pictures group 300, where each secret-keyword 152 from the 2 secret-keywords ("pair" and "bird", $302_a$ and $302_b$, respectively) is represented by a respective single secret-picture ($302_a$ and $302_b$). Similarly, in FIG. 9b, 2 example secret-pictures $302_c$ and $302_d$, respectively, are presented in a single pictures group 300, where each secret-keyword 152 from the two secret-keywords ("play" and "book", $302_c$ and $302_d$, respectively) is represented by a respective single secret-picture ($302_c$ and $302_d$).

To generalize this issue, in a group of K pictures, only Q pictures of the presented group of pictures 300 represent the currently sought secret-keyword in the sequential list of secret-keywords, wherein K>>Q and Q>0. While typically, Q=1, Q, may be computed, for example without limitations, as Q=K/10, or Q=K/15, or Q=K/20, etc. Q can be set by the user in step 201 of the configuration stage 202, or via parameter, is shown as item 420 in configuration frame 400 (see FIG. 2c).

Referring back to FIGS. 9a and 9b, the user is expected to first choose the picture $302_a$ (for example, with no limitations, by clicking or double-clicking thereon), in order to select from a first group of pictures 300 (see FIG. 9a) the secret-keyword "pair", and then choose the picture $302_b$ in order to select from the first group 300 of pictures 305 the secret-keyword "bird". Similarly, the user is expected to then choose the picture $302_c$ in order to select from a second group 300 of pictures 305 (see FIG. 9b) the secret-keyword "play", and then choose the picture $302_d$ in order to select from the second group 300 of pictures 305 the secret-keyword "book". It should be noted that FIG. 9b includes the picture 302$_b$ that was selected in FIG. 9a for hiding the secret-keyword. However, with respect to the pictures group layout 300 shown in FIG. 9b, the picture 302$_b$ serves only as another background/noise picture 305.

It should be further noted that it would be advantageous for the pictures selecting algorithm to minimize re-usage/repetition of secret-pictures 302 for a specific secret-keyword 152. For example, if the secret-keyword 152 is "pair", it would be advantageous for the algorithm to make best effort to provide different pictures when selecting another group 300 of pictures 305 that represent the currently sought secret-keyword ("pair"). For example, when the user selects (step 288) an optional refresh button 310 (see FIG. 10), the next picture 305 representing the secret-keyword ("pair" in this example) is preferably different from previously presented picture 305 for that secret-keyword ("pair" in this example). It should be appreciated that the user might be unsure which picture 305 represent the currently sought secret-keyword 152, and thus, may use the optional refresh button 310 (see FIG. 10) in order to reload a different group of pictures 300 (and respectively the keywords list that is associated with each picture 305). But as stated, typically (when Q=1), only one of the pictures 305 will still represent the currently sought secret-keyword.

It should be further noted that pictures presented may be reused, and previously used keywords may be reused. For example: the current secret-keyword is "pair" and the previous secret-keyword was "woman". A single picture 305 in current pictures group 300 may represent both keywords "woman" and "pair", with already used picture 302$_a$. As shown in FIG. 8, depicts the N (N=4, in this example) pictures (302$_a$, 302$_b$, 302$_c$, and 302$_d$) that have been selected by the password-entry system 100 to respectively represent the ordered list of secret-keywords. In this example all the candidate keywords 155 that are associated with each picture 302, are also shown, for explanation purposes only. It can be seen that the picture 302, in group 301, that is associated with the keyword "pair" is also associated with the keyword "woman".

Step 290: selecting a picture that represents the currently sought secret-keyword 152.

Once presented to the user, the user is required to identify the picture that is paired with the currently sought secret-keyword. The groups of pictures are presented to the user by password-entry system 100, wherein each picture may be associated with a number of keywords, and wherein each keyword may be associated with multiple pictures.

Referring back to FIGS. 6a-6d, these figures depict, by way of example only, different groups 300 of pictures 305 being presented to the user. The depicted pictures relate to previously described example having the following ordered list of secret-keywords 152: {"pair", "bird", "play", "book"}. Hence, the first secret-keyword, in this example, is "pair". FIG. 6a depicts a group 300 of pictures 305, wherein only picture 302$_a$ represents the sought-picture, being the only picture that is associated with the keyword {"pair"}. Hence, the user is expected to select picture 302$_a$.

It should be appreciated that upon selection of the first of the N secret-keyword 152 or when the user requests, password-entry system 100 present to the user another next group 300 of pictures 305 from which the user is expected to select the next (second) sought picture 302$_b$ that is the only picture associated with the next (second) secret-keyword: "bird". This process of selecting the next sought picture 302 continues until all secret-keywords 152 have been orderly selected by the user (see example hereabove).

Step 292: checking if the user has made the correct picture selection.

Password-entry system 100 checks if the user has made the correct picture selection. Upon determining that the selected picture does not represent the currently sought secret-keyword, password-entry system 100 enters incorrect symbols (step 293) into the input device and presents the user with a group of K pictures.

Step 296: entering password segment associated with the selected secret-keyword 152.

After each selection of the picture paired with the respective sought picture 302, password-entry system 100 appends the textual password segment associated with the selected keyword into the text input means 168.

It should be appreciated that the user may cancel password-entry method 200 (step 294) at any step before the conclusion of the pictures-selection process, before finishing selecting all of the required secret-keywords 152. This implies that a partial list of password textual segments has been entered into text input mean 168, accordingly. The user may continue typing the missing textual symbols of the secret password. Therefore, allowing for partial keyword insertion, or combination of keyboard usage and password-entry system 100 usages.

Step 297: checking if all N secret-keywords have been selected.

Password-entry system 100 may check if all N secret-keywords been selected.

If all N secret-keywords been selected, it means that the expected textual secret password has been entered into the text input means 168.

If not, go to step 286 for selecting the next secret-keyword 152.

Optionally, password-entry system 100 continue providing more picture dummy-selections till the user decides of completion of the picture selection process or decides to cancel. This approach conceals the number of secret-keywords N to hostile people or processes overlooking the password entry process. This alternative is less automatic and requires more actions from users, but more secure.

Step 298: completing the entered password and return control to the runtime-environment.

Upon completing entering the expected textual secret password into the text input means 168, the expected textual secret password is provided/handed-over to the secured runtime-environment 130 for authentication.

(end of description the steps of the runtime stage 204 of method 200)

The password-entry system 100 can include an optional textual user interface and/or a vocal user interface. Reference is made to FIG. 10 that depicts an example, with no limitations, a text mode layout 350, from which the user can orderly select at least one secret-keyword 152.

In the textual user interface, the pictures layout display 300, where the pictures layout 300 includes K pictures 305, is substituted with a layout of text-frames mode layout 350 of K text-frames 355, wherein each text-frame 355 contains a list of one or more candidate keywords 155. It should be appreciated that as with the group layout 300 of pictures 305, only Q text-frames 352 contain the sought secret-keyword 152. In the non-limiting example shown in FIG. 10, the sought text-frames 352 that is expected to be selected by the user, contains the sought secret-keyword 152: "thermometer".

Optionally, the user may select the text button (320) (see FIG. 10) to toggle between a text mode layout 350 display and a pictures layout display 300.

The text-frames 355 can be presented to the user with a textual user interface or an equivalent user interface. The user selects the text-frame 352 that contains the sought secret-keyword 152. A runtime population algorithm, known to the user, is configured to populate candidate keywords 155 into respective text-frames 355. For example, in FIG. 10, the text-frames 355 the candidate keywords are sorted by their initial letter. The text-frame population algorithm may assist the user to estimate which text-frame 355 is a good candidate for selection. It should be appreciated that in order to save the user time that is needed to read/listen to all of the text-frames 355, and still facilitating the user to select the appropriate text-frame 352 that contains the sought secret-keyword 152. It should be further appreciated that the text-frame population algorithm may be static or configurable to users, or configurable to authenticators.

It should be appreciated that the textual layout with the textual data in a frame can be delivered as vocal interface using vocal translation technology such as (but not limited to) screen reader. It should be appreciated that such a vocal interface may also serve the visually impaired. The vocal interface may read aloud the keywords in textual frames, facilitate pictures 305/text-frames 355 navigation, and appropriate selection upon the completion of each read pictures 305/text-frame 355.

The user may select to stop password entry system with a user interface command (button, keyboard, gesture) (340) to close "Password with pictures" screen, and continue with manual typing the password using the keyboard (this is equivalent to typing the <ESC>key).

The user interface may include a progress indicator, such as status-indicator 330, that indicates which secret-keyword in the list is being sought. When the pictures group for the first sought secret-keyword 152 is presented to the user, it indicated by progress bar 330 as illustrated in FIG. 10. The user might require repeating a wrong previous selection by selecting the appropriate previous selection in the progress indicator.

The user may replace the displayed group of pictures 300 or text frames 350 by selecting the refresh feature (310, see FIG. 10) or its equivalent UI. Upon activation of the refresh feature, the sought secret-keyword is not changed (and thus the progress bar 330 is not changed), but the displayed group of pictures 300 or text frames 350 and possibly the layout is changed, waiting for user to select an appropriate picture. The refresh feature 310 can be useful for ambiguous pictures. For example in FIG. 6a, the butterfly has a pair of wings and the muscular man has a pair of lift weights.

When password insertion password-entry system 100 is complete, the user may continue using the runtime environment, as if the password was manually entered. The user may invoke password-entry system 100 embodiment again, with the proper UI gesture inside text input mean 168 and password-entry system 100 embodiment will open to the corresponding pictures' group 300.

The disclosed password-entry method 200 has the benefits both, to the end user and to the runtime-environment providers. For the end user, it is easier to remember passwords, alleviates keyboard typing, enhances security, proves human access ("Captcha"), consolidates embodiment provision to all user's devices. The disclosure being thus described in terms of embodiments and examples, it will be obvious that the same may be varied in many ways. Such variations are not to be regarded as a departure from the spirit and scope of the disclosure, and all such modifications as would be obvious to one skilled in the art are intended to be included within the scope of the following claims.

What is claimed is:

1. A consistent password-entry method for assisting insertion of a textual password identification, by a user, into an input device, the method comprising the steps of:

In a preliminary password configuration stage:
  a) activating a password-entry system;
  b) receiving from the user or from a secured runtime-environment, by said password-entry system, a textual password having M characters, wherein said characters are selected from a set of common keyboard character entries;
  c) by said password-entry system, presenting the user with one or more lists, each list having a plurality of candidate secret-keywords, or a conceptual question, where in respective secret-keywords are determined in real time by said password-entry system;
  d) selecting, by the user, N secret-keywords from said presented candidate secret-keywords or questions, wherein said secret-keywords is determined in real time is performed using a remote IOT (Internet-Of-Things) sub-system that is interfaced to the password-entry system by an IOT module;
  e) segmenting a password space into N vacant-password-placeholders, by said password-entry system;
  f) orderly associating each of said vacant-password-placeholders with a respective secret-keyword from said N selected secret-keywords, forming an ordered list of secret-keywords; and
  g) saving a pair of said vacant-password-placeholder and respective secret-keyword in an addressable memory storage location accessible to said password-entry system, at a runtime stage, at a runtime-environment, upon an authentication request from an authenticator:
  a) activating said password-entry system, by either the user or automatically;
  b) by said password-entry system,
    i. retrieving said received textual password; and
    ii. retrieving said ordered list of associated pairs of said vacant-password-placeholder and respective secret-keyword from said memory storage location;
  c) segmenting the textual password into N password-textual-segments, by said password-entry system;
  d) orderly populating, by said password-entry system, each of said vacant-password-placeholder with a respective password-textual-segment, being associated with a secret-keyword;
  e) presenting the user with a group of K pictures, wherein of each of said K pictures associated with at least one pre-selected candidate keyword by said password-entry system, and wherein only Q pictures of said presented group of pictures represent a secret-keyword, in the ordered list of secret-keywords, and wherein K>>Q, N=Q and Q>0;
  f) selecting, by the user, a picture representing the secret-keyword;
  g) verifying, by said password-entry system, that said selected picture is associated with the secret-keyword h) entering into the input device, by said password-entry system, the password-textual-segment associated with said identified secret-keyword; and i) repeat runtime steps (e)-(h) until the user or said password-entry system select to return control to the runtime-environment, wherein the input device contains the textual password identification retrieved by said password-entry method, in response to the authentication request.

2. The consistent password-entry method as in claim 1, wherein said password-entry system is activated by the user or by a secured runtime-environment provider.

3. The consistent password-entry method as in claim 1, wherein K>Q*5.

4. The consistent password-entry method as in claim 1, wherein parameters selected from a group of parameters consisting of N, K Q and others are configurable.

5. The consistent password-entry method as in claim 1, wherein a picture, in a presented group of pictures, is associated with a minimum of L keywords, and thereby, the minimum number of keywords associated with a presented group of K pictures is K*L keywords.

6. The consistent password-entry method as in claim 1, wherein said secret-keywords are selected from a group of conceptual words, including objects, states of an object, creatures, events, verbs, locations, monuments, adjectives, adverbs, time, characters, symbols, graphics and combinations thereof.

7. The consistent password-entry method as in claim 1, wherein said verifying that the selected picture represents the secret-keyword from said selected pictures comprises the steps of:

a) determining, by said password-entry system, from said selected picture, if the selected picture is associated with the secret-keyword; and b) upon determining that the selected picture is not associated with the currently sought secret-keyword, entering incorrect symbols into the input device, by said password-entry system, and returning to runtime step (e) by presenting the user with the group of K pictures.

8. The consistent password-entry method as in claim 1, wherein said (b,ii) retrieving said pairs of said vacant-password-placeholder and secret passwords secret-keyword from said memory storage location; said (c) segmenting the textual password into N password-textual-segments; and said (d) orderly associating each of said vacant-password-placeholder with a respective password-textual-segment and thereby, with the secret-keyword, are performed at the preliminary password configuration stage.

9. The consistent password-entry method as in claim 1, wherein the textual password is a multiple-use password.

10. The consistent password-entry method as in claim 1, wherein a password-textual-segment length ranges from NULL to S symbol characters, wherein S≤M.

11. The consistent password-entry method as in claim 10, wherein said parameter S is configurable.

12. The consistent password-entry method as in claim 1, wherein said password-entry system selects to return control to the runtime-environment upon determining that all N secret password-textual-segments have been orderly entered into the input device.

13. The consistent password-entry method as in claim 1, wherein said selecting of at least one of said selected secret-keywords comprises selecting a conceptual secret-question, wherein the an response to said selected conceptual secret-question is associated with said selected secret-keyword.

14. The consistent password-entry method as in claim 13, wherein said conceptual secret question has been indirectly associated with said selected picture during said password configuration stage, being both associated with said selected secret-keyword.

15. The consistent password-entry method as in claim 13, wherein a response to each of said conceptual secret-questions is selected from the group of concepts including: objects, states of an object, creatures, events, verbs, locations, monuments, adjectives, adverbs, time, characters, symbols, graphics and combinations thereof.

16. The consistent password-entry method as in claim 13, wherein a picture and/or a secret-keyword is associated with a plurality of secret-questions.

17. The consistent password-entry method as in claim 13, wherein a picture and/or a secret-keyword are associated with a secret-question regardless of objects depicted in said particular picture.

18. The consistent password-entry method as in claim 13, wherein a picture is associated with a question within a recent time context, and wherein said recent time context is selected from a group of time periods including a fraction of an hour, an hour, a day, a number of days, a week, a number of weeks, a month, a number of months, a year, a lifecycle stage, a season, an era, a number of years and a combination thereof.

19. The consistent password-entry method as in claim 1, wherein said determining a response in real time is performed using the IOT sub-system of the password-entry system.

20. The consistent password-entry method as in claim 13, wherein the password entry system is used to respectively enter a portion of the textual password into at least one pre-determined vacant-password-placeholder.

21. The consistent password-entry method as in claim 20, wherein said at least one pre-determined vacant-password-placeholder is determined in the runtime stage.

22. The consistent password-entry method as in claim 21, wherein the position of said at least one pre-determined vacant-password-placeholder, within the textual password is determined in the runtime stage.

23. The consistent password-entry method as in claim 1, wherein said preliminary password configuration stage further comprises at least one method of memorizing a hint phrase representing said ordered list of secret-keywords or list of expected responses.

24. The consistent password-entry method as in claim 1, wherein received textual password is received in the runtime stage from runtime-environment.

25. The consistent password-entry method as in claim 24, wherein said received textual password is hidden from the user.

26. The consistent password-entry method as in claim 1, wherein said user is presented with K text-frames instead of K pictures, wherein each of K text-frames is associated a group of with at least one pre-selected candidate keyword by said password-entry system, wherein the user selects a text-frame representing the secret-keyword, and wherein only Q text-frames of said presented group of text-frames represent the secret-keyword, in the ordered list of secret-keywords, and wherein K>>Q, N≥Q and Q>0.

27. The consistent password-entry method as in claim 26, wherein said password-entry system comprises a textual user interface or a vocal user interface for presenting said text-frames.

28. The consistent password-entry method as in claim 26, wherein said password-entry system comprises a runtime population-algorithm known to the user, and wherein said runtime population-algorithm is configured to populate candidate keywords into respective text-frames.

29. The consistent password-entry method as in claim 28, wherein said runtime population-algorithm is configured to assisting the user to estimate which text-frame is a good candidate for selection.

30. The consistent password-entry method as in claim 1, wherein when said password-entry system presents a group of pictures for the user to select said secret-keyword, said password-entry system further presents a refresh activation feature, wherein when the user activates said refresh activation feature said password-entry system presents another group of pictures, wherein a new picture that is associated with said secret-keyword is preferably different from previously presented picture that is associated with said secret-keyword.

31. The consistent password-entry method as in claim 1, wherein said pictures are stored in a candidate pictures storage.

32. The consistent password-entry method as in claim 31, wherein said candidate pictures storage is a dynamic storage that can be updated at either the preliminary password configuration stage, or the runtime stage or both.

33. The consistent password-entry method as in claim 32, wherein said update is performed automatically and autonomously from the user's activity.

* * * * *